United States Patent
Lee et al.

(10) Patent No.: US 10,564,686 B2
(45) Date of Patent: Feb. 18, 2020

(54) METHOD FOR CONTROLLING OPERATION OF ELECTRONIC DEVICE AND ELECTRONIC DEVICE USING THE SAME

(71) Applicant: Samsung Electronics Co., Ltd., Gyeonggi-do (KR)

(72) Inventors: Kwanho Lee, Seoul (KR); Yongsang Yun, Gyeonggi-do (KR); Jungoh Sung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 409 days.

(21) Appl. No.: 14/925,296

(22) Filed: Oct. 28, 2015

(65) Prior Publication Data

US 2016/0116952 A1 Apr. 28, 2016

(30) Foreign Application Priority Data

Oct. 28, 2014 (KR) .................. 10-2014-0147098

(51) Int. Cl.
*G05B 15/02* (2006.01)
*G06F 1/20* (2006.01)
(Continued)

(52) U.S. Cl.
CPC .............. *G06F 1/206* (2013.01); *G05B 15/02* (2013.01); *G06F 1/1626* (2013.01); *G06F 1/203* (2013.01);
(Continued)

(58) Field of Classification Search
CPC ........ G06F 1/206; G06F 1/1626; G06F 1/203; G06F 1/3231; G06F 1/324; G06F 1/325; G06F 3/0346; G06F 2200/1636; G06F 2200/1637; G05B 15/02
See application file for complete search history.

(56) References Cited

U.S. PATENT DOCUMENTS 7,702,937 B2 4/2010 Oh et al.
8,989,792 B1 * 3/2015 Depew ................ H04B 1/3838
455/117
(Continued)

FOREIGN PATENT DOCUMENTS

KR 10-2006-0074331 A 7/2006
KR 10-2013-0051569 A 5/2013
(Continued)

OTHER PUBLICATIONS

PCT International Search Report dated Feb. 12, 2016.
European Search Report dated Sep. 5, 2017.
European Search Report dated Dec. 3, 2019.

*Primary Examiner* — Brian W Wathen
*Assistant Examiner* — Hung H Dang
(74) *Attorney, Agent, or Firm* — Cha & Reiter, LLC

(57) ABSTRACT

Provided are an electronic device and a method for controlling an operation of the electronic device. The method may include sensing a temperature of at least one component forming a portion of the electronic device and generating a first signal based on the sensed temperature; sensing at least one of a movement of the electronic device, an approach state of an object to the electronic device, and a contact state of the object with the electronic device and generating a second signal based on at least one of the movement of the electronic device, the approach state of the object, and the contact state of the object; and controlling an operation of the at least one component based on at least one of the first signal and the second signal.

20 Claims, 17 Drawing Sheets

(51) Int. Cl.
   *G06F 1/16* (2006.01)
   *G06F 1/3231* (2019.01)
   *G06F 1/324* (2019.01)
   *G06F 1/3234* (2019.01)
   *G06F 3/0346* (2013.01)

(52) U.S. Cl.
   CPC .............. *G06F 1/324* (2013.01); *G06F 1/325* (2013.01); *G06F 1/3231* (2013.01); *G06F 3/0346* (2013.01); *G06F 2200/1636* (2013.01); *G06F 2200/1637* (2013.01); *Y02D 10/126* (2018.01); *Y02D 10/173* (2018.01)

(56) References Cited

U.S. PATENT DOCUMENTS

| | | |
|---|---|---|
| 2002/0167488 A1 | 11/2002 | Hinckley et al. |
| 2006/0193113 A1 | 8/2006 | Cohen et al. |
| 2011/0251733 A1 | 10/2011 | Atkinson et al. |
| 2011/0273378 A1 | 11/2011 | Alameh et al. |
| 2012/0032894 A1 | 2/2012 | Parivar et al. |
| 2013/0120630 A1* | 5/2013 | Kim .................. H04N 5/23241 348/333.01 |
| 2014/0236380 A1 | 8/2014 | Alton et al. |
| 2014/0262128 A1* | 9/2014 | Barnes .................. G06F 1/1626 165/11.1 |
| 2015/0331462 A1* | 11/2015 | Atkinson ................ G06F 3/044 713/100 |

FOREIGN PATENT DOCUMENTS

| | | |
|---|---|---|
| WO | 2011/123149 A1 | 10/2011 |
| WO | 2014/077081 A1 | 5/2014 |
| WO | 2014/098788 A1 | 6/2014 |

\* cited by examiner

METHOD FOR CONTROLLING OPERATION OF ELECTRONIC DEVICE AND ELECTRONIC DEVICE USING THE SAME

CLAIM OF PRIORITY

This application claims priority from and the benefit under 35 U.S.C. § 119(a) of Korean Patent Application No. 10-2014-0147098, filed on Oct. 28, 2014, which is hereby incorporated by reference for all purposes as if fully set forth herein.

TECHNICAL FIELD

Various embodiments of the present disclosure relate to a method for analyzing the use state of a user of an electronic device and controlling the operation of the electronic device based on the analyzed use state, and an electronic device using the same.

BACKGROUND

Recent electronic devices such as portable terminals may detect movement of the electronic device, an approach state of an object to the electronic device, or a contact state of an object with the electronic device, using various sensor modules. In addition, the electronic device may identify whether various functions such as communication, multimedia, and gaming are being executed.

SUMMARY

As portable terminals have been developed into high-performance electronic devices capable of supporting multitasking and high resolution, heat generation by such electronic devices is inevitable, thereby inconveniencing users who use the electronic devices.

Meanwhile, if an electronic device deteriorates the performance of the electronic device by applying the same criteria according to the result of measuring the internal temperature thereof, this may cause the user to distrust the performance of the electronic device. Therefore, it is desirable to control the performance of the electronic device according to a situation.

In various embodiments of the present disclosure, movement of the electronic device, a contact state (e.g. contact location or contact time) between the electronic device and an object, or an approach state of an object to the electronic device may be sensed using at least one sensor module. In addition, the electronic device may confirm execution information of various functions which are being executed in the electronic device. The electronic device may control the operation of the electronic device based on at least one of movement of the electronic device, the approach state of an object to the electronic device, the contact state of the object with the electronic device, and the function execution information. Therefore, since the performance of the electronic device can be controlled according to various situations, user requirements for high performance can be satisfied and inconvenience caused by heat generation can be appropriately solved.

In accordance with an aspect of the present disclosure, an electronic device is provided. The electronic device may include: at least one component; at least one first sensor configured to sense a temperature of the at least one component and generate a first signal based on the sensed temperature; at least one second sensor configured to sense at least one of a movement of the electronic device, an approach state of an object to the electronic device, and a contact state of the object with the electronic device and generate a second signal based on at least one of the movement of the electronic device, the approach state of the object, and the contact state of the object; and at least one processor, such that the at least one processor may control an operation of the at least one component based on at least one of the first signal and the second signal.

In accordance with another aspect of the present disclosure, a method for controlling an operation of an electronic device is provided. The method may include: sensing a temperature of at least one component forming a portion of the electronic device and generating a first signal based on the sensed temperature; sensing at least one of a movement of the electronic device, an approach state of an object to the electronic device, and a contact state of the object with the electronic device and generating a second signal based on at least one of the movement of the electronic device, the approach state of the object, and the contact state of the object; and controlling an operation of the at least one component based on at least one of the first signal and the second signal.

In accordance with another aspect of the present disclosure, a computer-readable recording medium is provided. The computer-readable recording medium may record a program for executing operations including: sensing a temperature of at least one component forming a portion of the electronic device and generating a first signal based on the sensed temperature; sensing at least one of a movement of the electronic device, an approach state of an object to the electronic device, and a contact state of the object with the electronic device and generating a second signal based on the movement of the electronic device, the approach state of the object, and the contact state of the object; and an operation of controlling an operation of the at least one component based on at least one of the first signal and the second signal.

BRIEF DESCRIPTION OF THE DRAWINGS

The embodiments of the present disclosure will be more apparent from the following detailed description taken in conjunction with the accompanying drawings, in which.

DETAILED DESCRIPTION

Figure 1:
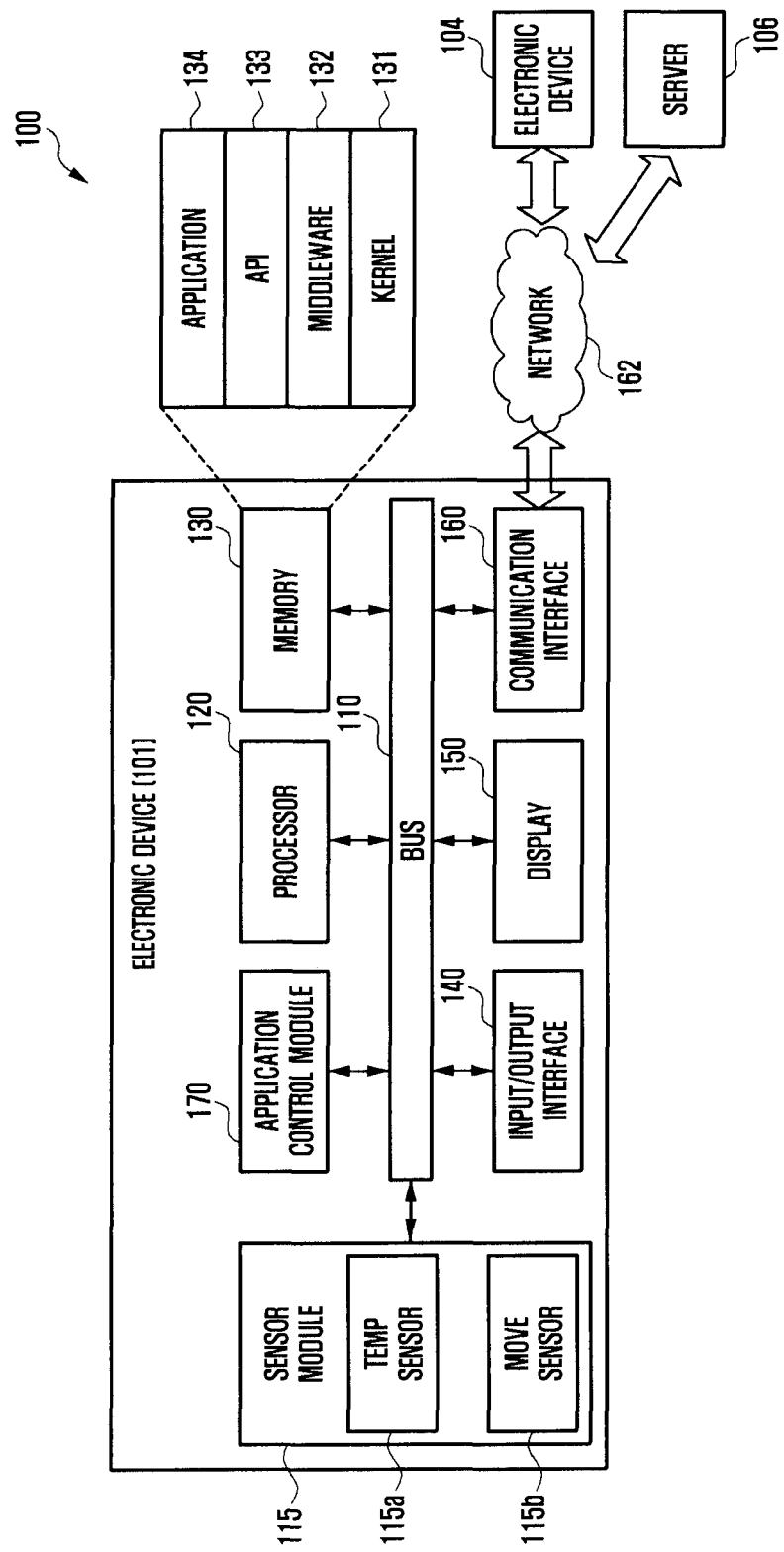
FIG. 1 is a diagram illustrating a network environment including an electronic device according to various embodiments of the present disclosure.

Hereinafter, example embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or implementation having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are example only and not to be considered as a limitation of this disclosure.

FIG. 1 is a block diagram illustrating a network environment 101 including therein an electronic device 100 in accordance with an embodiment of the present disclosure. Referring to FIG. 1, the electronic device 100 may include, but not limited to, a bus 110, a sensor module 115, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The sensor module 115 can include first sensor(s) 115a sensing the temperature of a component and providing signal(s) based on the sensed temperature of the component.

In certain embodiments, the component can comprise the processor 120. The first signal(s) can include a signal indicative of either a temperature of a portion of the electronic device 100, or a surface temperature of the electronic device 100.

The sensor module 115 can also include second sensor(s) 115b that sense motion. For example, the second sensor(s) 115b can sense any of movement of the electronic device 100, an object approaching the electronic device 100 (an approach state of the object), an object coming into contact with the electronic device 100 (a contact state of the object), and provides signal(s) based thereon.

In certain embodiments, the second sensor(s) 115b can include any of, or a combination of, but not limited to, an acceleration sensor, gyro sensor, a geomagnetic sensor, a gesture sensor, a grip sensor, a proximity sensor, a biometric sensor, a temperature sensor, an illuminance sensor, an ultraviolet (UV) sensor, and a Hall sensor.

The second sensor(s) can sense any one of, or a combination of an approach location of the object, a contract location of the object, and a contact time of the object upon sensing at least one of the approach state and/or the contact state of the object.

The processor 120 may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

As noted above, the first sensors(s) 115a senses the temperature of a component. In certain embodiments, the processor 120 can calculate a temperature of a portion of the electronic device 100 based on the first signal(s). The processor 120 controls the operation of the sensed component based on the signal(s) from the first sensor(s) 115a and the second sensor(s) 115b. The processor 120 can control the operation of the component by analyzing function execution information of the electronic device 100 and predicting at least one of the approach state and the contact state of the object based on the function execution information.

In certain embodiments, the processor 120 can set a reference temperature. When the temperature corresponding to or calculated by the processor 120 from the signal(s) from the first sensor(s) 115a equal or exceed the reference temperature, the processor 120 can place the electronic device 100 in a limited mode of operation. Alternatively, the processor 120 can place the component in a limited mode of operation.

Additionally, when an object makes contact at a point or approaches the electronic device 100 farther than a predetermined distance from the surface of the electronic device 100 adjacent to the component, the processor 120 can lower the reference temperature.

Additionally, the processor 120 can lower the reference temperature when a contact time of an object and the electronic device 100 reaches a contact limit time associated with the reference temperature.

The memory 130 may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be implemented by software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 100.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 100 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 100 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 100 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 100, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 100 or an application received from an external electronic device (e.g., the server 106 or the electronic device 104).

In certain embodiments, the memory 130 can store a program for executing an operation of sensing a temperature of at least one component constituting the electronic device and generating a first signal based on the sensed temperature; an operation of sensing at least one of movement of the electronic device, an approach state of an object to the electronic device, and a contact state of the object with the electronic device and generating a second signal based on the movement of the electronic device, the approach state of the object, and the contact state of the object; and an operation of controlling an operation of the component based on at least one of the first signal and the second signal.

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 100 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 100 and any external device may be supported by at least one of the application 134, the API 133, the middleware 132, the kernel 131, or the communication interface 160.

The application control module 170 may process at least part of information obtained from the other elements (e.g., the processor 120, the memory 130, the input/output interface 140, or the communication interface 160, etc.) and then offer it to a user in various ways. For example, the application control module 170 may recognize information about access components equipped in the electronic device 100, store such information in the memory 130, and execute the application 134 on the basis of such information. A further description about the application control module 170 will be given hereinafter through FIGS. 2 to 9.

Figure 2:
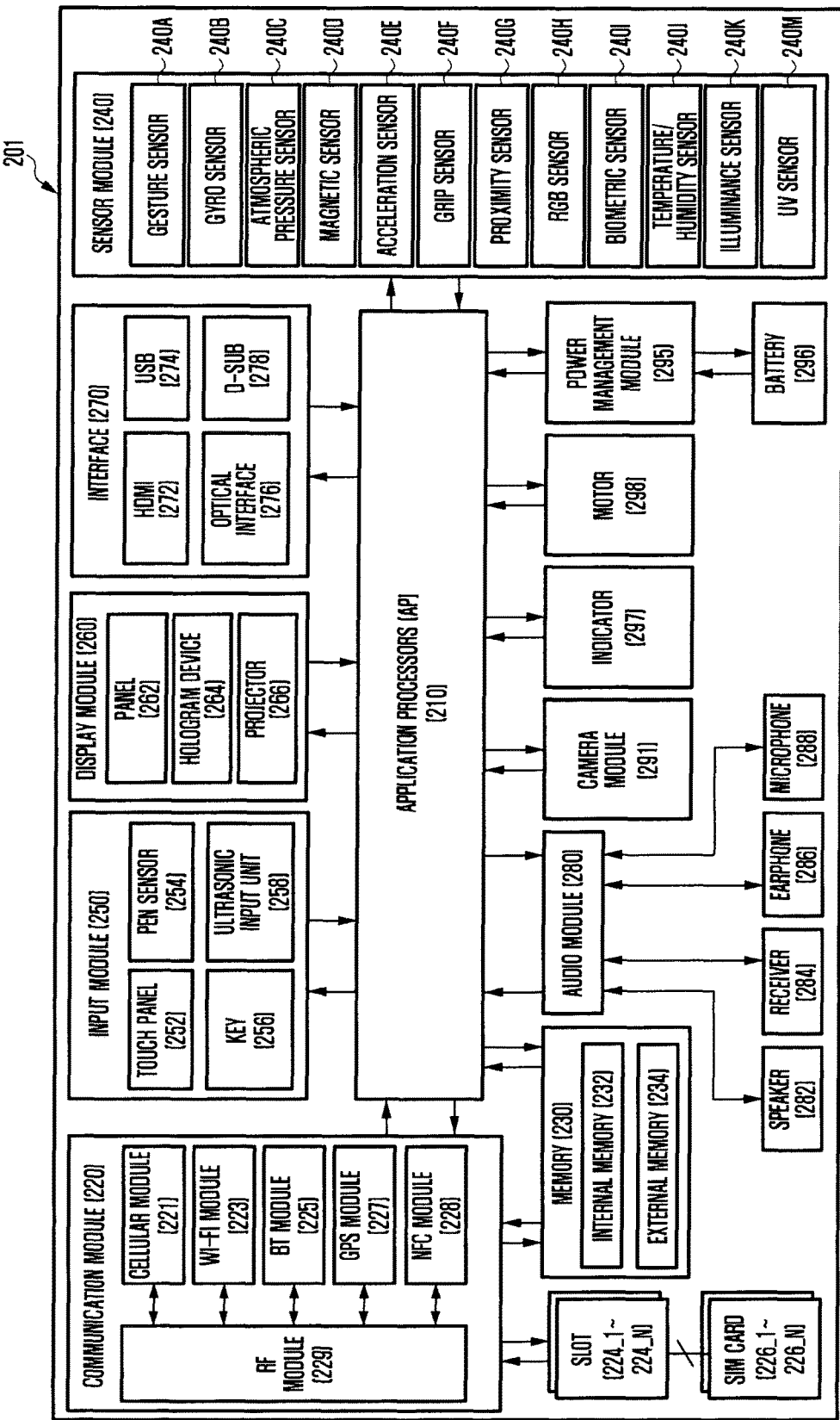
FIG. 2 is a block diagram of an electronic device according to various embodiments of the present disclosure.

FIG. 2 is a block diagram illustrating an electronic device 200 in accordance with an embodiment of the present disclosure. The electronic device 200 may form, for example, the whole or part of the electronic device 100 shown in FIG. 1. Referring to FIG. 2, the electronic device 200 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 100) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes either hardware, or hardware equipped with suitable software and/or firmware. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Meanwhile, a controller of the electronic device 101 according to various embodiments of the present disclosure may be interpreted as a device or a module capable of performing the same function as the processor 120 and the AP 210.

A component of the electronic device 100 according to various embodiments of the present disclosure may be interpreted as a device or a module forming a portion of the electronic device 100, such as the AP 210, communication module 220, display module 260, or camera module 291.

A motion sensor of the electronic device 101 according to various embodiments of the present disclosure may mean at least one combination of a gyro sensor 240B or 460, an acceleration sensor 240E or 465, and a geomagnetic sensor 455 and may sense movement of the electronic device 101 using the sensor combination.

In the present disclosure, "contact" may mean direct contact between a detected object and the electronic device 200 or at least one component of the electronic device 200. Alternatively, "contact" in the present disclosure may mean approach of the detected object to within a preset distance from the electronic device 200 or at least one component of the electronic device 200.

Hereinafter, a method for controlling the operation of the electronic devices 100, 104, or 200 according to various embodiments will be described with reference to the attached drawings. In certain embodiments, the memory 230 can store a plurality of instructions that when executed by, for example the application processor 210, perform the method for controlling the operation of the electronic devices 100, 104, or 200.

Figure 3:
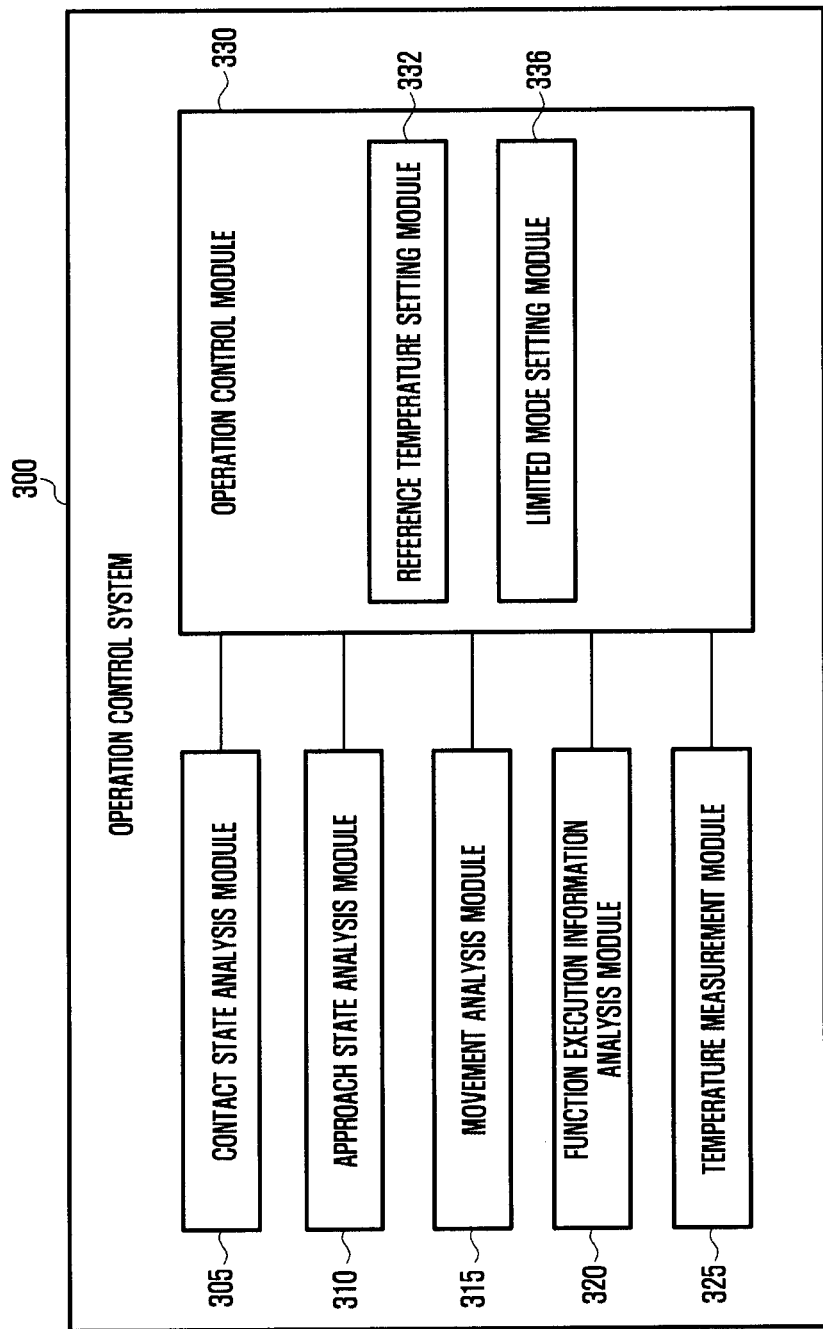
FIG. 3 is a diagram illustrating the implementation of an operation control system of an electronic device according to various embodiments of the present disclosure.

FIG. 3 is a diagram illustrating the implementation of an operation control system of an electronic device 100, 200 according to various embodiments of the present disclosure.

Referring to FIG. 3, an operation control system 300 may include a contact state analysis module 305, an approach state analysis module 310, a movement analysis module 315, a function execution information analysis module 320, a temperature measurement module 325, and an operation control module 330.

In certain embodiments, the contact state analysis module 305, the approach state analysis module 310, the movement analysis module 315, the function execution information analysis module 320, and the temperature measurement module 325 can be implemented in the memory 230 as a plurality of instructions that are executable by a processor, such as AP 210 or processor 120.

In certain embodiments, the operation control module 330 can form a portion of the AP 210 or processor 120.

The operation control system 300 may control the operation of the electronic device 200 based on at least one of movement of the electronic device 200, a contact state between the electronic device 200 and an object, an approach state of the object to the electronic device 200, a function execution state, and a temperature.

The contact state analysis module 305 may measure at least one of the contact location and contact maintenance time of an arbitrary object (e.g. a part of the user's body or a cover) with the electronic device 200. The measured contact location and/or contact maintenance time of the user may be used by the operation control module 330 to control the operation of the electronic device 200.

The contact state analysis module 305 may measure the location at which the object comes into contact with the electronic device 200 using at least one sensor module 240.

For example, the contact state analysis module 305 may measure the contact location of the user using a grip sensor 340F formed outside the electronic device 200. The contact state analysis module 305 may also measure the contact location of the user using the touch panel 252 coupled with the display module 260.

The contact state analysis module 305 may check whether the object comes into to contact with the surface of the electronic device 200 that is adjacent to at least one component (e.g. a device or module generating heat during operation) of the electronic device 200 using the at least one sensor module 240.

For example, a component, such as the AP 210, the communication module 220, the camera module 291, or the power management module 295, may be located in the electronic device 200. A plurality of modules performing respective functions in the electronic device 200 may be mounted on a Printed Circuit Board (PCB) in the electronic device 200 and may be located in a specific region. The electronic device 200 may store the location of at least one component in the memory 230.

Therefore, the contact state analysis module 305 may compare the location of the component stored in the memory 230 with the contact location of the object to analyze at least one component region with which the object comes into contact.

The contact state analysis module 305 may measure a contact time, during which the object is contact with the electronic device 200, using at least one sensor module 240.

For example, the contact state analysis module 305 may measure a contact maintenance time, during which the user remains in contact with the electronic device 220, using the grip sensor 240F formed outside the electronic device 200. In addition, the contact state analysis module 305 may measure the contact maintenance time of the user with the electronic device 220 using the touch panel 252 coupled with the display module 260. Meanwhile, a contact time may represent not only the contact maintenance time but also a time interval between a contact start time and a contact end time. In this case, if there is no contact for a preset time, the contact time may be measured again by initializing the touch start time.

As the contact time between the electronic device 200 and the user increases, there is a high probability of harming the user (e.g. causing a low-temperature burn). For example, according to EN 563, which is a standard guideline regarding the temperatures of touchable surface, the user may get a low-temperature burn after a contact time of one minute at a surface temperature (e.g. glass temperature) of 56 degrees Celsius/132.8 degrees Fahrenheit, 10 minutes at a surface temperature of 48 degrees Celsius/118.4 degrees Fahrenheit, or 8 hours at a surface temperature of 43 degrees Celsius/109.4 degrees Fahrenheit. Therefore, the contact time measured by the contact state analysis module 305 may be used to control the operation of the electronic device 200. Meanwhile, a maximum time during which contact is permitted for a given temperature may be defined as a contact limit time. For example, at a temperature of 48 degrees Celsius/118.4 degrees Fahrenheit, the contact limit time may be defined as 10 minutes and at a temperature of 43 degrees Celsius/109.4 degrees Fahrenheit, the contact limit time may be defined as 8 hours.

The approach state analysis module 310 may analyze the approach location of an arbitrary object (e.g. a part of the user's body or a cover) that is approaching the electronic device 200. The measured approach location of the object may be used by the operation control module 330 to control the operation of the electronic device 200.

The approach state analysis module 310 may measure the location of the object approaching one region of the electronic device 220 using at least one sensor module 240.

For example, the approach state measurement module 310 may sense variation in electrostatic capacitance according to the approach of the object using the touch panel 252 coupled with the display module 260 and measure the approach location of the object based on variation in the electronic capacitance. Thus, the measured approach location of the object may be used by the operation control module 330 to control the operation of the electronic device 200.

The approach state analysis module 310 may check whether the object approaches the surface of the electronic device 200 adjacent to at least one component (e.g. a device or module that generates heat during operation) of the electronic device 200 using the at least one sensor module 240.

As an example, a component, such as the AP 210, the communication module 220, the camera module 291, or the power management module 295, may be located in the electronic device 200. A plurality of modules performing respective functions in the electronic device 200 may be mounted on a PCB in the electronic device 200 and may be located in a specific region. The electronic device 200 may store the location of at least one component in the memory 230.

Accordingly, the approach state analysis module 310 may compare the location of a component stored in the memory 230 with the approach location of the object to determine whether the object approaches at least one component region.

The movement analysis module 315 may analyze the movement of the electronic device 200. The measured movement of the electronic device 200 may be used by the operation control module 330 to control the operation of the electronic device.

The movement analysis module 315 may sense the movement of the electronic device 200 using a motion sensor. The motion sensor may represent at least one combination of a gyro sensor 240B or 460, an acceleration sensor 240E or 465, and a geomagnetic sensor 455.

For example, the movement analysis module 315 may sense, using the motion sensor, that the user is moving while carrying the electronic device 200. That is, the movement analysis module 315 may analyze the moving or stopped state of the user of the electronic device 200. The measured movement of the electronic device 200 may be used by the operation control module 330 to control the operation of the electronic device 200.

The function execution information analysis module 320 may determine the type and state of a function which is being executed in the electronic device 200.

For example, the function execution information analysis module 320 may check whether a phone call function is being executed in the electronic device 200. In addition, when data is being downloaded, the function execution information analysis module 320 may determine a remaining time until download of the data is completed and analyze function execution information as to whether the electronic device 200 is being used in a landscape mode or a portrait mode.

The temperature measurement module 325 may sense the temperature of the electronic device 200 using the temperature sensor 240J. The temperature measurement module 325 may generate a signal based on the sensed temperature and transmit the signal to the operation control module 330. Specifically, the temperature measurement module 325 may measure the temperatures of components using the temperature sensor 240J and calculate a portion of the electronic device (e.g. the surface of the electronic device 200 or a predetermined internal region of the electronic device 200) based on the measured temperatures. The predetermined internal region may include a component. That is, the temperature of a component in which the temperature sensor 240J is not installed may be calculated based on a temperature measured in another component. Meanwhile, the temperature sensor 240J may be installed in an electronic device such as a PCB, a battery, or a flexible PCB (FPCB) in the electronic device 200. In addition, the temperature sensor 240J may be located on the surface of at least one component or in the housing of the electronic device 200. The temperature measurement module 325 may calculate an average value of the temperatures of components by measuring the temperature of each component and use the average value as the temperature of the electronic device 200.

In various embodiments of the present disclosure, the temperature measurement module 325 may acquire the temperature of a portion of the electronic device 200 (e.g. the surface of the electronic device 200 or a predetermined region in the electronic device 200) based on the measured or calculated temperature of the component. According to an embodiment, the temperature measurement module 325 may analyze the temperature of the surface of the electronic device 100 with which the user comes into contact. Specifically, the temperature measurement module 325 may analyze the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In various embodiments of the present disclosure, referring to FIG. 3, the contact state analysis module 305, the approach state analysis module 310, the movement analysis module 315, the function execution information analysis module 320, and the temperature measurement module 325 may not operate independently in the operation control system 300 and may operate in the operation control module 330. In addition, a reference temperature setting module 332 and a limited mode setting module 336 may not be included in the operation control module 330 but may be independently included in the operation control system 300.

The operation control module 330 may include the reference temperature setting module 332 and the limited mode setting module 336. The operation control module 330 may control the operation of the electronic device 200 when the temperature (e.g. the temperature of a component or the temperature of a portion of the electronic device 200) measured or calculated using the temperature measurement module 325 exceeds a reference temperature.

The reference temperature setting module 332 may set a reference temperature which is a reference for controlling the operation of the electronic device 200. The reference temperature may mean a temperature which is a reference for changing the operation mode (e.g. a normal mode or a limited mode) of at least one component constituting the electronic device 200. Specifically, the reference temperature setting module 332 may set a temperature at which the limited mode is to be activated using at least one of the movement of the electronic device, the approach of an object to the electronic device 200, and contact of the object with the electronic device 200.

In an embodiment, the reference temperature setting module 332 may set the reference temperature to a high value when the user approaches and/or comes into contact with a region which is distant from a component of the electronic device 200. This is because the probability of causing the user harm, such as a low-temperature burn, is reduced in a situation in which the user does not approach and/or come in contact with a region close to the component. If the reference temperature is increased, since at least one component constituting the electronic device 200 operates in a normal mode for a longer time compared with the case where the reference temperature is not increased, the electronic device 200 may provide a more suitable environment to the user.

In an embodiment, the reference temperature setting module 332 may set the reference temperature to a low value when the user approaches and/or comes into contact with a region adjacent to the component of the electronic device 200. This is because the probability of harming the user, such as causing a low-temperature burn, increases in a situation in which the user approaches and/or comes in contact with a region close to the component. If the reference temperature is decreased, since at least one component constituting the electronic device 200 may rapidly switch to a limited mode and operate in the limited mode compared with the case where the reference temperature is not decreased, the electronic device 200 can be prevented from generating excessive heat and thus inconvenience such as a low-temperature burn can be prevented.

In an embodiment, the reference temperature setting module 332 may set the reference temperature to a high value when the user moves while carrying the electronic device 200 in a pocket or a bag. This is because the probability of causing harm, such as a low-temperature burn, is reduced in a situation in which the user does not directly come in contact with the electronic device 200. If the reference temperature is increased, since at least one component constituting the electronic device 200 operates in a normal mode for a longer time compared with the case where the reference temperature is not increased, the electronic device 200 may provide a more suitable environment to the user in performing a function.

The limited mode setting module 336 may set a limited mode for controlling the operation of the electronic device 200. The limited mode may mean a state for limiting the operation of at least one component constituting the electronic device 200. Specifically, the limited mode setting module 336 may set the limited mode differently using at least one of the movement of the electronic device 200, the approach state of an object, the contact state of an object.

In an embodiment, the limited mode setting module 336 may set a mode to a first limited mode when the user approaches and/or comes into contact with a region adjacent to the component of the electronic device 200. In the first limited mode, the electronic device 200 may operate at lower performance than in a normal mode. For example, in the first limited mode, the limited mode setting module 336 may change the clock of the processor 120 from 2.1 GHz to 0.7 GHz and change display brightness from 400 cd to 200 cd. That is, the limited mode setting module 336 may set the clock, display brightness, camera frame rate, camera resolution, or charge current according to the first limited mode to a lower value than in the normal mode.

In an embodiment, the limited mode setting module 336 may set a mode to a second limited mode when the user approaches and/or comes into contact with a region distant from the component of the electronic device 200. In the second limited mode, the electronic device 200 may operate at lower performance than in the normal mode but at higher performance than in the first limited mode. For example, in the second limited mode, the limited mode setting module 336 may change the clock of the processor 120 from 2.1 GHz to 1.4 GHz and change display brightness from 400 cd to 300 cd. That is, in the second limited mode, the limited mode setting module 336 may set the clock, display brightness, camera frame rate, camera resolution, or charge current to a lower value than in the normal mode and to a higher value than in the first limited mode. This is to avoid unnecessarily abruptly lowering the performance of the electronic device 200 in a situation in which the user of the electronic device 200 does not come in contact with a region close to the component of the electronic device 200. Therefore, in the second limited mode, since at least one component constituting the electronic device 200 may operate at higher performance than in the first limited mode, the electronic device 200 may provide a more suitable environment to the user in performing functions.

Although the limited mode setting module 336 may set the limited mode to simultaneously control the performance of all components constituting the electronic device 200, the limited mode setting module 336 may limit the performance of at least one component located within a predetermined distance from a region with which the user comes into contact in consideration of the approach state of the user.

In an embodiment, when the user comes into contact with a region adjacent to a charge device, the limited mode setting module 336 may set the limited mode in the charge device. For example, the limited mode setting module 336 may limit a charge current of 1 A of the charge device to 450 mA and maintain the performance of at least one remaining component.

In an embodiment, when the user comes into contact with a region adjacent to a camera module and a processor, the limited mode setting module 336 may set the limited mode in the camera module and the processor. As an example, the limited mode setting module 336 may limit a camera frame rate of 30 frames/sec to 15 frames/sec and limit a processor clock of 2.1 GHz to 1.4 GHz. Therefore, the charge current of the charge device may be maintained at 1 A without restrictions.

The electronic device 200 according to various embodiments of the present disclosure may include at least one component; at least one first sensor for sensing the temperature of the component and generating a first signal based on the sensed temperature; at least one second sensor for sensing at least one of the movement of the electronic device, the approach state of an object to the electronic device 200, and the contact state between the object and the electronic device 200 and generating a second signal based on the movement of the electronic device, the approach state of the object to the electronic device 200, and the contact state between the object and the electronic device 200; and at least one processor. The processor may control the operation of the component based on at least one of the first signal and the second signal.

The component may include the processor.

The second sensor may include at least one of an acceleration sensor 240E, a gyro sensor 240B, a geomagnetic sensor 455, a gesture sensor 240A, a grip sensor 240F, a proximity sensor 240G, a vital signs sensor 450, a temperature sensor 240I, an illuminance sensor 240K, an ultraviolet (UV) sensor 240M, and a Hall sensor 430.

The second sensor may sense at least one of the approach location, contact location, and contact time of the object upon sensing at least one of the approach of the object and the contact state between the object and the electronic device.

The processor may calculate at least one of the temperature of a portion of the electronic device and the surface temperature of the electronic device based on the first signal.

The first signal may be a signal regarding at least one of the temperature of a portion of the electronic device and the surface temperature of the electronic device.

In controlling the operation of the component, the processor may set a reference temperature at which a limited mode is to be activated and activate the limited mode when at least one of a temperature corresponding to the first signal and a temperature calculated from the first signal is equal to or greater than the reference temperature.

The processor may lower the reference temperature when at least one of the contact location and approach location of the object is closer than a predetermined distance from the surface of the electronic device adjacent to the component and raise the reference temperature when at least one of the contact location and approach location of the object is farther than the predetermined distance from the surface of the electronic device adjacent to the component.

The processor may lower the reference temperature when the contact time of the object reaches a contact limit time, depending on the temperature.

The processor may control the operation of at least one component which is located at a region closer than a predetermined distance from at least one of the contact location and approach location of the object.

The processor may analyze function execution information of the electronic device and control the component by predicting at least one of an approach state and a contact state of the object based on the function execution information. The function execution information may include at least one of the type of function that is being executed in the electronic device and the execution state of the function.

Figure 4A:
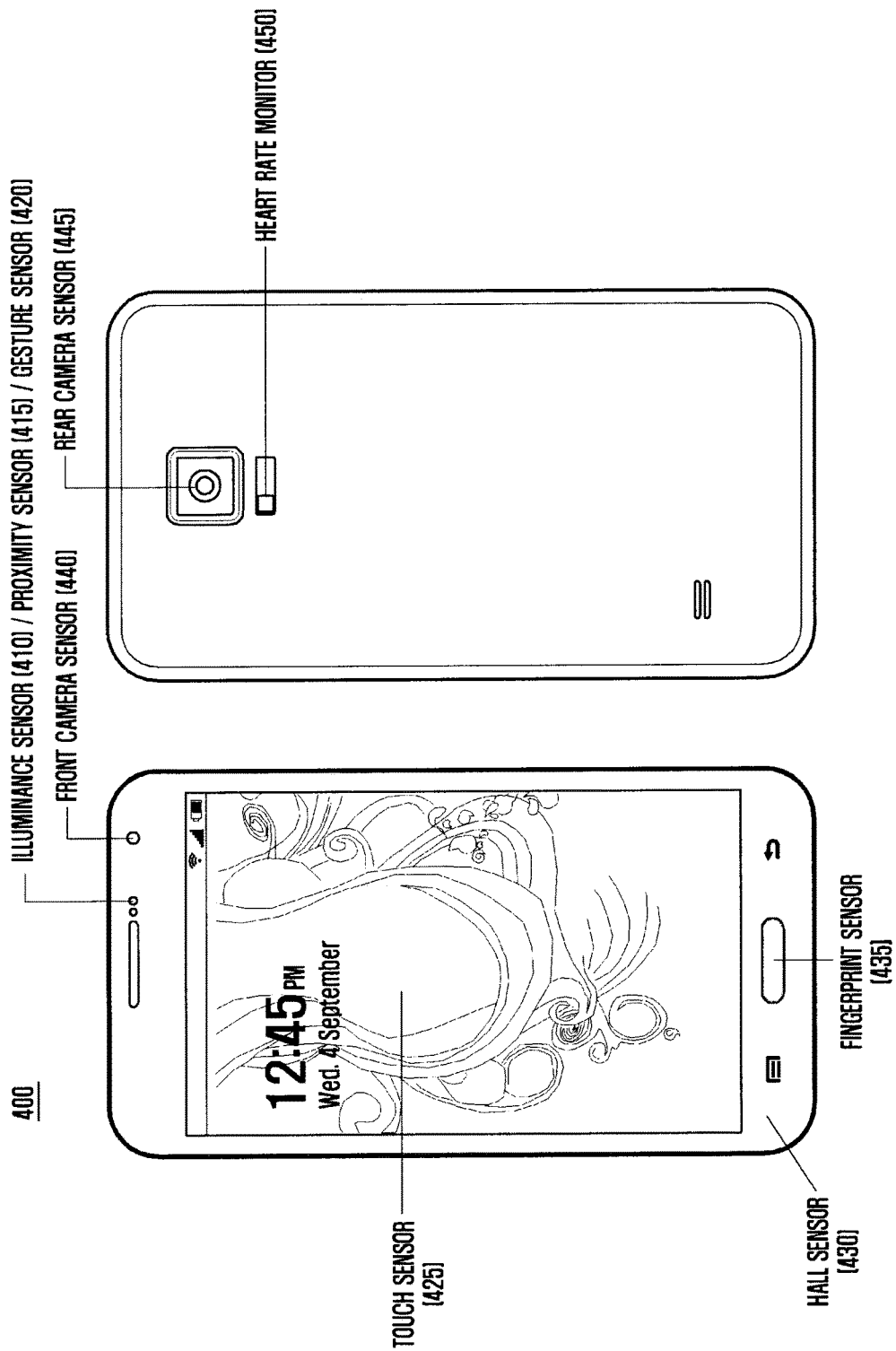
FIG. 4A is a diagram explaining the locations of sensor modules installed in an electronic device by using the external shape of the electric device according to various embodiments of the present disclosure.

FIG. 4A is a block diagram describing potential locations of sensor modules installed in an electronic device 400 by using the external shape of the electronic device 400 according to various embodiments of the present disclosure.

Referring to FIG. 4A, an illuminance sensor 410 or 240K, a proximity sensor 415 or 240G, a gesture sensor 420 or 240A, a touch sensor 425, a Hall sensor 430 or 240D, a fingerprint sensor 435, and a front camera sensor 440 may be located on the front of an electronic device 400. A rear camera sensor 445 and a heart rate monitor 450 may be located on the back of the electronic device 400. Meanwhile, the camera module 291 illustrated in FIG. 2 may include the front camera sensor 440 and/or the rear camera sensor 445.

The electronic device 400 may sense the movement of the electronic device 400, the approach state of an object, and the contact state of the object using at least one sensor module installed in the electronic device 400.

In an embodiment, if the user comes into contact with the touch panel 252, the electronic device 400 may sense a contact location and/or a contact time using the touch sensor 425 of the front on the electronic device 400. The electronic device 400 may also sense whether an arbitrary object approaches the electronic device 400 using the illuminance sensor 410 or 240K, the proximity sensor 415 or 240G, or the gesture sensor 420 or 240A.

The electronic device 400 may control the operation of at least one component constituting the electronic device 400 using at least one of the movement of the electronic device 400, the approach state of the object, and the contact state of the object.

In an embodiment, the electronic device 400 may analyze whether the electronic device 400 is in the pocket or bag of the user using the illuminance sensor 410 or 240K. In this case, since the user does not directly come in contact with the electronic device 400, the electronic device 400 may be maintained in a high performance state. If the user is measuring his/her heart rate using the heart rate monitor 450, the electronic device 400 may sense that the contact location of the user is a heart rate monitor region. Accordingly, the electronic device 400 may control the operation of at least one component located within a preset range from the heart rate monitor region.

Figure 4B:
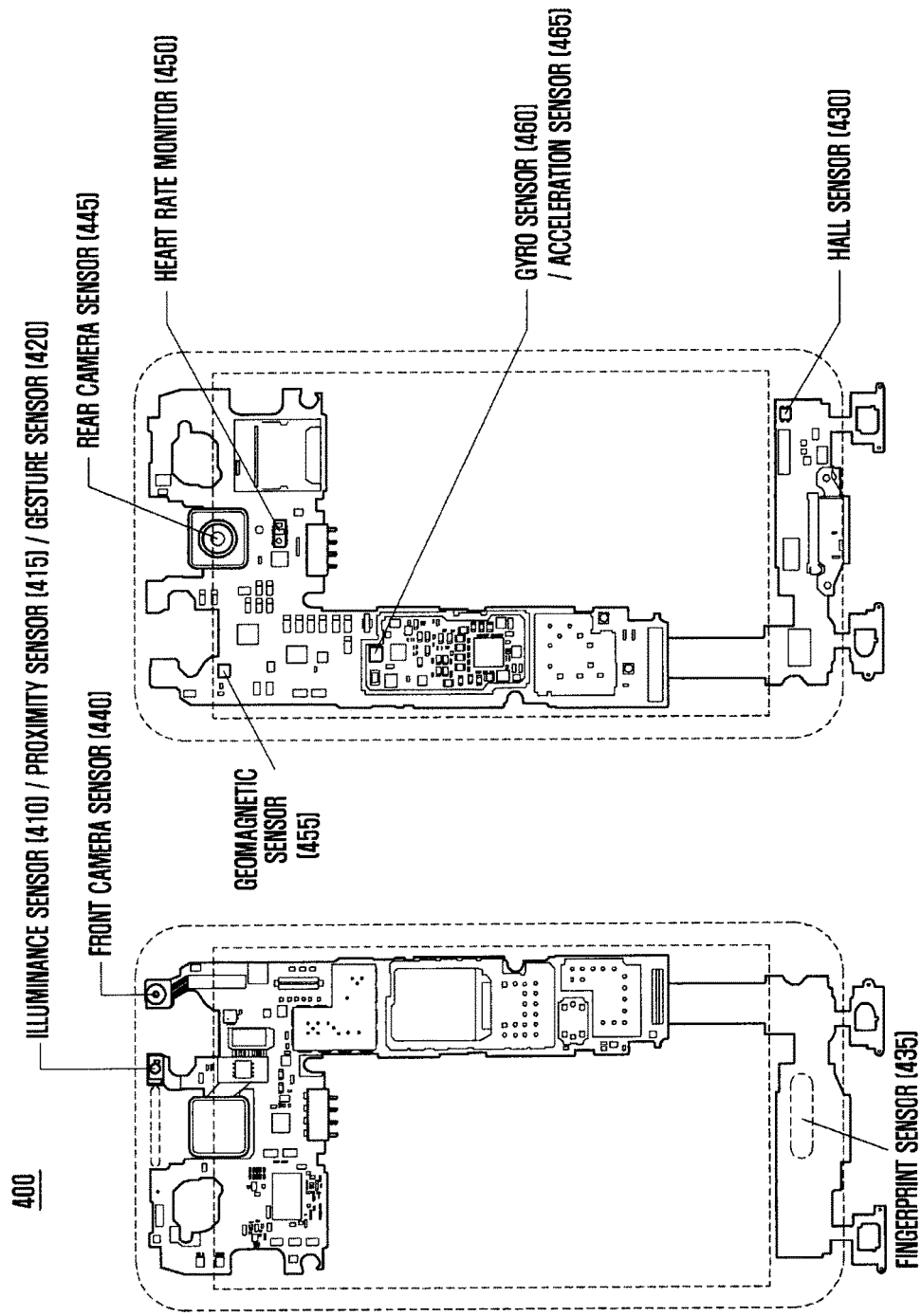
FIG. 4B is a diagram explaining the locations of sensor modules installed in an electronic device by using the inner shape according to various embodiments of the present disclosure.

FIG. 4B is a diagram explaining the locations of sensor modules installed in an electronic device by using the inner shape according to various embodiments of the present disclosure.

Referring to FIG. 4B, an illuminance sensor 410 or 240K, a proximity sensor 415 or 240G, a gesture sensor 420 or 240A, a Hall sensor 430 or 240D, a fingerprint sensor 435, a front camera sensor 440, a rear camera sensor 445, a heart rate monitor 450, a geomagnetic sensor 455, a gyro sensor 460 or 240B, and an acceleration sensor 465 or 240E may be located on a PCB in the electronic device 400. Further, a grip sensor (not shown) may be located in a portion of the electronic device 400 (e.g. a housing, a PCB, or an internal component of the electronic device 400).

The electronic device 400 may sense at least one of the movement of the electronic device 400, the approach state of an object, and the contact state of the object using at least one sensor installed in the electronic device 400.

In an embodiment, when the user moves while carrying the electronic device 400, the electronic device 400 may sense the movement of the electronic device 400 using at least one of the geomagnetic sensor 480, the gyro sensor 490, and the acceleration sensor 495. The electronic device 400 may also sense whether the user comes into contact with the electronic device 400 or approaches the electronic device 400 using an internal grip sensor (not shown). For example, the grip sensor (not shown) may sense whether the user approaches or comes into contact with the electronic device 400 using at least one of an antenna pattern, a metal bezel, and a metal pattern layer of the electronic device 400.

The electronic device 400 may control the operation of at least one component constituting the electronic device 400 using at least one of the movement of the electronic device 400, the approach state of the object, and the contact state of the object.

In an embodiment, the electronic device 400 may analyze whether the electronic device 400 is covered with a cover using the Hall sensor 430 or 240D. When the electronic device 400 is covered with a cover, the user is less likely to come in direct contact with the display module 260 or does so less frequently. The electronic device 400 can be maintained at performance normal mode of operation.

Figure 5:
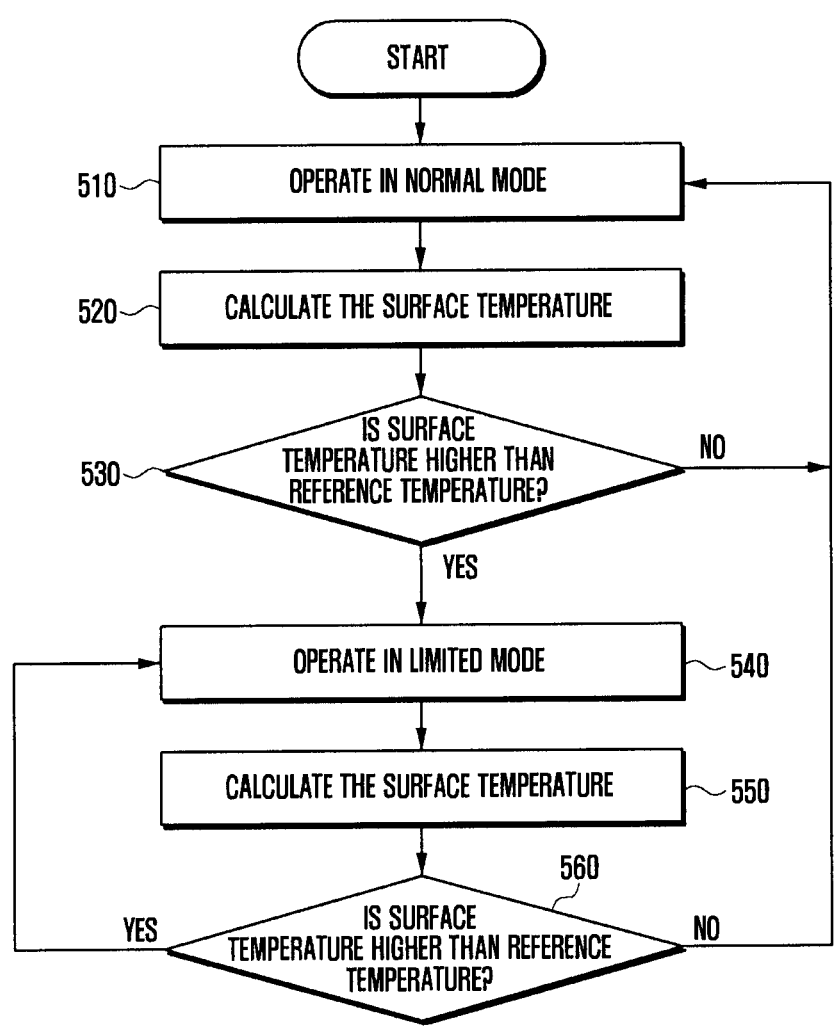
FIG. 5 is a flowchart of a routine for measuring the inner temperature of an electronic device and activating a limited mode based on the measured temperature according to various embodiments of the present disclosure.

FIG. 5 is a flowchart of a method for measuring the inner temperature of an electronic device and activating a limited mode based on the measured temperature according to various embodiments of the present disclosure.

The electronic device 200 may operate in a normal mode in step 510. The normal mode may indicate a state in which the electronic device 200 is not set to a limited mode.

In step 520, the electronic device 200 may calculate the surface temperature of the electronic device. For example, a processor 120/210 may measure the temperatures of components using the temperature sensor 240J and calculate the temperature of a portion of the electronic device 200 (e.g. the surface or a predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the calculated average value as the temperature of the electronic device 200.

The electronic device 200 may measure the temperature of the surface of the electronic device 200 in step 520 based on the measured temperatures of the components. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200. In certain embodiments, the processor 120/210 may use the foregoing measurements to calculate the surface temperature of the electronic device 200.

The electronic device 200 may compare the surface temperature with a preset reference temperature in step 530. The reference temperature may be preset by a manufacturer or set by the operating control module 330.

If the surface temperature is lower than the reference temperature in step 530, the electronic device 200 may return to step 510 to operate in the normal mode.

If the surface temperature is higher than the reference temperature in step 530, the electronic device 200 may proceed to step 540, such that the operating control module 330, via limited mode setting module 336 causes the electronic device 200 to operate in the limited mode.

The electronic device 200 may activate the limited mode for controlling the operation of the electronic device 200 in step 540. The limited mode may mean a state for limiting the operation of a component (e.g. a controller or a display) constituting the electronic device 200.

For example, the clock of the AP 210 of the electronic device 200, the resolution of a display, or the frame rate of a camera may be lowered to a value less than a predetermined level. The electronic device 200 may control the surface temperature of the electronic device 200 through performance deterioration by activating the limited mode.

The electronic device 200 may calculate the surface temperature by measuring the temperature of a component forming a portion of the electronic device 200 in step 550. The electronic device 200 may measure the temperature of at least one component using the temperature sensor 240J. The electronic device 200 may use the measured temperature to obtain the average value of the temperatures of components.

The electronic device 200 may measure the surface temperature based on the measured temperature of the component in step 550. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

The electronic device 200 may compare the surface temperature with a reference temperature in step 560. Meanwhile, the reference temperature may be preset by a manufacturer or set by the operating control module 330.

If the surface temperature is lower than the reference temperature in step 560, the electronic device 200 may return to step 510 to continue to operate in the normal mode.

If the surface temperature is higher than the reference temperature in step 560, the electronic device 200 may return to step 540 to operate in the limited mode.

Figure 6:
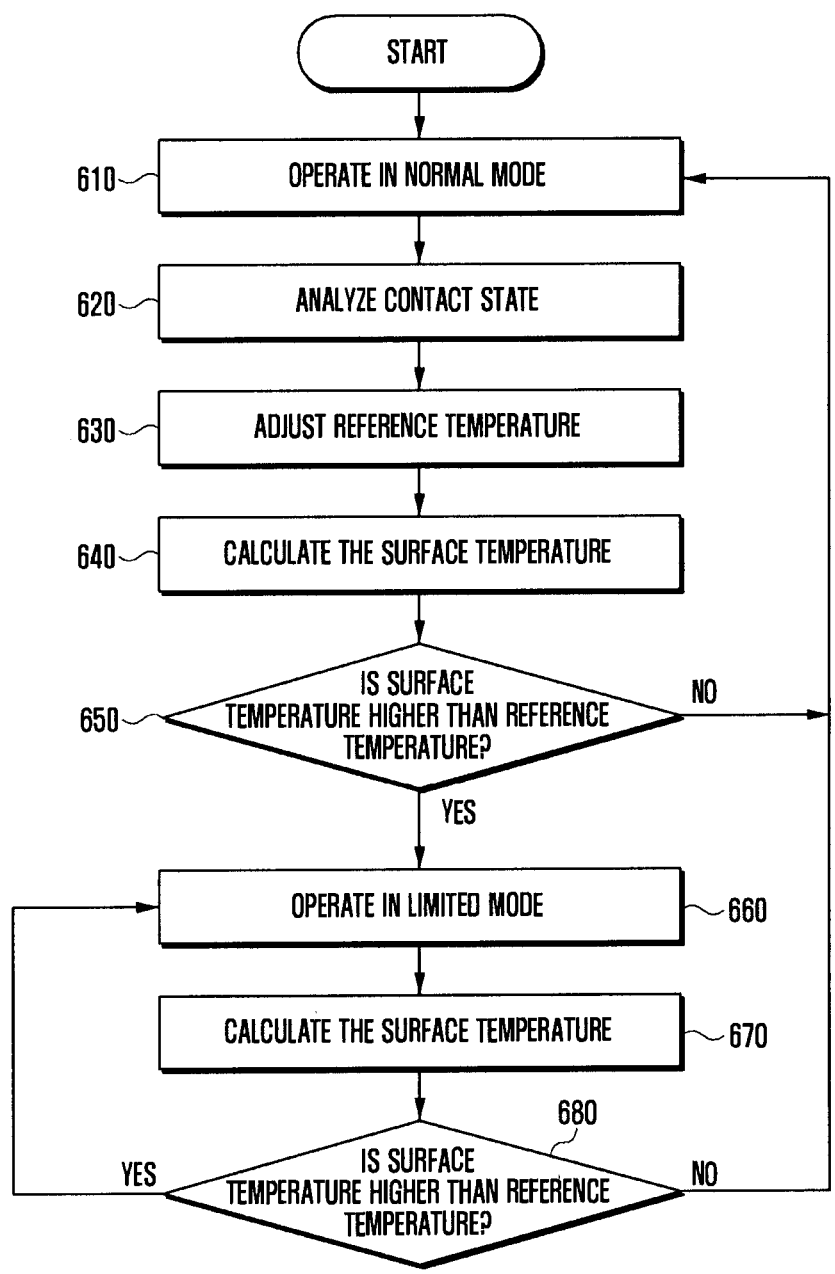
FIG. 6 is a flowchart of a method for setting a reference temperature based on a contact state of a user with an electronic device with the object to control the operation of the electronic device according to various embodiments of the present disclosure.

FIG. 6 is a flowchart of a method for setting a reference temperature based on the user contact state of an electronic device and to control the operation of the electronic device according to various embodiments of the present disclosure.

The electronic device 200 may operate in a normal mode in step 610. The normal mode may indicate a state in which the electronic device 200 is not set to a limited mode.

The electronic device 200 may analyze a contact state of the user using at least one sensor module 240 in step 620. The contact state of the user may include a contact location and a contact time. The measured contact location and contact time of the user may be used to control the operation of the electronic device 200 by changing a reference temperature for executing the limited mode. Here, the term "contact" may include the meaning of approach. That is, the electronic device 200 may regard approach of a detection object to within a preset distance from some region, as well as direct contact of the detection object with the electronic device 200, as contact.

Analyzing the contact state during step 620 may include determining whether the user comes into contact within the vicinity of a component (e.g. a surface of the electronic device 200 perpendicular to the component) of the electronic device 200 using the sensor module 240. At least one component performing each function in the electronic device 200 may be located in a specific region on a PCB in the electronic device 200 and the electronic device 200 may load the location of at least one component from the memory 230. Accordingly, the electronic device 200 may determine whether the user comes into contact within the vicinity of the component of the electronic device 200 by comparing the location of the component with the contact location of the user.

The electronic device 200 may measure a contact time during which the user remains into contact with the electronic device 200 using the sensor module 240 in step 620. For example, the electronic device 200 may measure the contact time during which the user comes into contact with the electronic device 200 using the grip sensor 240F formed outside the electronic device 200. In addition, the electronic device 200 may measure the contact time of the user using the touch panel 252 coupled with the display module 260.

The electronic device 200 may adjust, in step 630, a reference temperature based on the contact state (contact location and/or contact time) of the user measured in step 620. "Adjust" in this context shall include a circumstance where the reference temperature value is re-evaluated based on the contact state analyzed during step 620, however, based on the re-evaluation, the reference temperature remains unchanged. The reference temperature may mean a temperature which is a reference for changing the operation mode (e.g. a normal mode or limited mode) of at least one component (e.g. a processor or a display module) constituting the electronic device 200. Specifically, the electronic device 200 may set a temperature at which the limited mode is to be executed using the contact state of the user.

In an embodiment, if the user comes into contact with a region distant from a component of the electronic device 200, the electronic device 200 may set the reference temperature to a high level. This is because there is a low probability of causing the user harm, such as a low-temperature burn, in a situation in which the user does not come in contact within the vicinity of the component. If the reference temperature is increased, since at least one component may operate in the normal mode for a longer time than an operation time before the reference temperature is increased, the electronic device 200 may provide a more suitable environment to the user in performing a function.

In an embodiment, if the user comes into contact with a region adjacent to the component of the electronic device 200, the electronic device 200 may set the reference temperature to a low level. This is because there is a high probability of causing a low-temperature burn in a situation in which the user comes into contact within the vicinity of the component. If the reference temperature is decreased, since at least one component forming a portion of the electronic device 200 may rapidly switch to the limited mode and operate in the limited mode compared with the case where the reference temperature is not decreased, the electronic device 200 can be prevented from generating excessive heat and thus avoiding a low-temperature burn.

In an embodiment, if the contact time of the user reaches a preset threshold value, the electronic device 200 may reset the reference temperature. For example, when the reference temperature of the electronic device 200 is 50 degrees Celsius/122 degrees Fahrenheit and the temperature of the surface of the electronic device 200 with which the user comes into contact is 48 degrees Celsius/118.4 degrees Fahrenheit, if the contact time of the user reaches 10 minutes, the possibility of the user suffering from a low-temperature burn may increase. Therefore, the electronic device 200 may change the reference temperature to 45 degrees Celsius/113 degrees Fahrenheit even if the surface temperature does not reach 50 degrees Celsius/122 degrees Fahrenheit which is a current reference temperature. The electronic device 200 may activate the limited mode more rapidly and can protect the user from a low-temperature burn by adjusting the reference temperature in response to the contact time of the user.

In step 640, the processor 120/210 may calculate the surface temperature. In certain embodiments, electronic device 200 may measure the temperatures of components using the temperature sensor 240J and calculate the temperature of a portion of the electronic device 200 (e.g. the surface or a predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 640. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 650, the electronic device 200 may compare the surface temperature with the reference temperature changed in step 630.

If the surface temperature is lower than the reference temperature in step 650, the electronic device 200 may return to step 610 to continue to operate in the normal mode.

If the surface temperature is higher than the reference temperature in step 650, the electronic device 200 may return to step 660 to operate in the limited mode.

The electronic device 200 may activate the limited mode for controlling the operation of the electronic device 200 in step 660. The limited mode may mean a state for limiting the operation of at least one component (e.g. a controller or a display) constituting the electronic device 200.

For example, the clock of the AP 210 of the electronic device 200, the resolution of a display, and the frame rate of a camera may be lowered to values less than respective predetermined levels. The electronic device 200 may control the surface temperature of the electronic device 200 through performance deterioration by operating in the limited mode.

The processor 120/210 may calculate the surface temperature of the electronic device in step 670. The electronic device 200 may measure the temperature of at least one component using the temperature sensor 240J. The electronic device 200 may use the measured temperature as the average value of components.

The electronic device 200 may measure the surface temperature of the electronic device 200 based on the measured temperatures of the components in step 670. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 680, the electronic device 200 may compare the surface temperature with the reference temperature changed in step 630.

If the surface temperature is lower than the reference temperature in step 680, the electronic device may return to step 610 to continue to operate in the normal mode.

If the surface temperature is higher than the reference temperature in step 680, the electronic device 200 may return to step 660 to operate in the limited mode.

In various embodiments, if the surface temperature is higher than the reference temperature in step 680, the electronic device 200 may return to step 620 to analyze a contact state of the user. That is, even if the surface temperature of the electronic device 200 is higher than the reference temperature, since the contact state of the user may be changed, the electronic device 200 may analyze the contact state of the user again. Next, the electronic device 200 may continue to perform an operation based on the above routine.

Meanwhile, an embodiment for the routine may be implemented based on at least one of the movement of the electronic device 200 and the approach state of an object, as well as based on the contact state between the electronic device 200 and the object.

Figure 7:
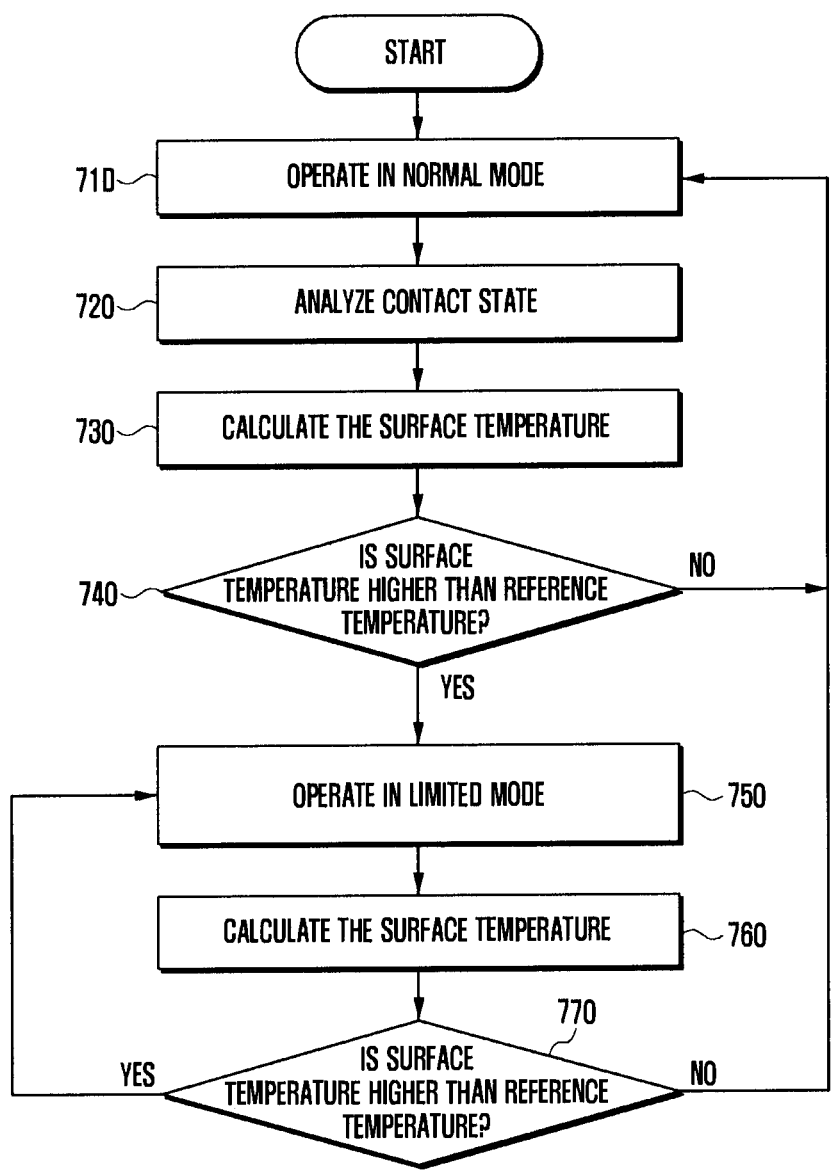
FIG. 7 is a flowchart of a method for setting a limited mode based on a contact state of a user with an electronic device to control the operation of the electronic device according to various embodiments of the present disclosure.

FIG. 7 is a flowchart of a method for setting a limited mode based on a contact state of a user with an electronic device to control the operation of the electronic device according to various embodiments of the present disclosure.

The electronic device 200 may operate in a normal mode in step 710. The normal mode may indicate a state in which the electronic device 200 is not set to a limited mode.

The electronic device 200 may analyze the contact state of the user using at least one sensor module 240 in step 720. The contact state of the user may include a contact location and a contact time. The measured contact location and contact time of the user may be used to control the operation of the electronic device 200 by changing a reference temperature for executing the limited mode. Meanwhile, the term "contact" may include the meaning of approach. That is, the electronic device 200 may regard approach of a detection object to within a preset distance from some region, as well as direct contact of the detection object with the electronic device 200, as contact.

The electronic device 200 may determine, in step 720, whether the user comes into contact with the vicinity of a component (e.g. a surface of the electronic device 200 perpendicular to the component) of the electronic device 200 using the sensor module 240. At least one component performing each function in the electronic device 200 may be located in a specific region on a PCB in the electronic device and the electronic device 200 may load the location of at least one component from the memory 230. Accordingly, the electronic device 200 may determine whether the user comes into contact with the vicinity of the component of the electronic device 200 by comparing the location of the component with the contact location of the user.

The electronic device 200 may measure a contact time, during which the user remains in contact with the electronic device 200, using the sensor module 240 in step 720. For example, the electronic device 200 may measure the contact time, during which the user is in contact with the electronic device 200, using the grip sensor 240F formed outside the electronic device 200. In addition, the electronic device 200 may measure the contact time of the user using the touch panel 252 coupled with the display module 260.

In step 730, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 730. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

The electronic device 200 may compare the surface temperature with a preset reference temperature in step 740.

If the surface temperature is lower than the reference temperature in step 740, the electronic device 200 may return to step 710 to continue to operate in the normal mode.

If the surface temperature is higher than the reference temperature in step 740, the electronic device 200 may return to step 750 to activate the limited mode based on the contact state of the user.

The electronic device 200 may differently activate the limited mode for controlling the operation of the electronic device 200 in step 750 based on the contact state of the user measured in step 720. The limited mode may mean a state for limiting the operation of a component (e.g. a controller or a display) constituting the electronic device 200. For example, the clock of the AP 210 of the electronic device 200, the resolution of a display, and the frame rate of a camera may be lowered to values less than predetermined levels. That is, the electronic device 200 may control the surface temperature of the electronic device 200 through performance deterioration by activating the limited mode.

The electronic device 200 may activate the limited mode in step 750 based on the contact location measured in step 720.

In an embodiment, the electronic device 200 may set a mode to a first limited mode when the user comes into contact with a region adjacent to the component of the electronic device 200. The first limited mode of the electronic device 200 may operate at lower performance than in a normal mode. For example, the electronic device 200 may change the clock of the processor 120 from 2.1 GHz to 0.7 GHz and change display brightness from 400 cd to 200 cd in the first limited mode. That is, the electronic device 200 may set the clock, display brightness, camera frame rate, camera resolution, or charge current according to the first limited mode to a lower value than in the normal mode.

In an embodiment, the electronic device 200 may set a mode to a second limited mode when the user comes into contact with a region distant from the component of the electronic device 200. In the second limited mode, the electronic device 200 may operate at lower performance than in the normal mode but at higher performance than in the first limited mode. For example, in the second limited mode, the electronic device 200 may change the clock of the processor 120 from 2.1 GHz to 1.4 GHz and change display brightness from 400 cd to 300 cd. That is, in the second limited mode, the electronic device 200 may set the clock, display brightness, camera frame rate, camera resolution, or charge current to a lower value than in the normal mode and to a higher value than in the first limited mode. This is because there is no need to abruptly lower the performance of the electronic device 200 in a situation in which the user of the electronic device 200 does not come in contact with the vicinity of the component of the electronic device 200. Therefore, in the second limited mode, since at least one component constituting the electronic device 200 may operate at higher performance than in the first limited mode, the electronic device 200 may provide a more suitable environment to the user in performing functions.

Although the electronic device 200 may set the limited mode to simultaneously control the performance of all components constituting the electronic device 200 in step 750, the electronic device 200 may limit the performance of a component included in a region with which the user comes into contact based on the contact state of the user measured in step 720.

In an embodiment, when the user comes into contact with a charge device region, the electronic device 200 may set the limited mode in the charge device region. For example, the electronic device 200 may limit a charge current of 1 A of the charge device to 450 mA and maintain the performance of at least one remaining component.

In an embodiment, when the user comes into contact with a camera module region and a processor region, the electronic device 200 may set the limited mode in the camera module region and the processor region. As an example, the electronic device 200 may limit a camera frame rate of 30 frames/sec to 15 frames/sec and limit a processor clock of 2.1 GHz to 1.4 GHz. Therefore, the charge current of the charge device may be maintained at 1 A without restrictions.

The electronic device 200 may activate the limited mode in step 750 based on the contact time of the user measured in step 720.

In an embodiment, if the contact time of the user reaches a preset threshold value, the electronic device 200 may activate the limited mode. For example, when the reference temperature of the electronic device 200 is 50 degrees Celsius and the temperature of the surface of the electronic device 200 with which the user comes into contact is 48 degrees Celsius, if the contact time of the user reaches 10 minutes, the possibility of the user suffering from a low-temperature burn may increase. Therefore, the electronic device 200 may immediately activate the limited mode even if the surface temperature does not reach 50 degrees Celsius which is a current reference temperature. Therefore, the electronic device 200 may activate the limited mode more rapidly and can protect the user from a low-temperature burn.

In step 760, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 760. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

The electronic device 200 may compare the surface temperature with a preset reference temperature in step 770. The reference temperature may be preset by a manufacturer.

If the surface temperature is lower than the reference temperature in step 770, the electronic device may return to step 710 to continue to operate in the normal mode.

If the surface temperature is higher than the reference temperature in step 770, the electronic device 200 may return to step 750 to operate in the limited mode.

In various embodiments, if the surface temperature is higher than the reference temperature in step 770, the electronic device 200 may return to step 7020 to analyze the contact state of the user. That is, even if the surface temperature of the electronic device 200 is higher than the reference temperature, since the contact state of the user may be changed, the electronic device 200 may analyze the contact state of the user again. Next, the electronic device 200 may continue to perform an operation based on the above method.

Meanwhile, an embodiment for the routine may be implemented based on the approach state of an object as well as on the contact state of the object with the electronic device 200.

Figure 8:
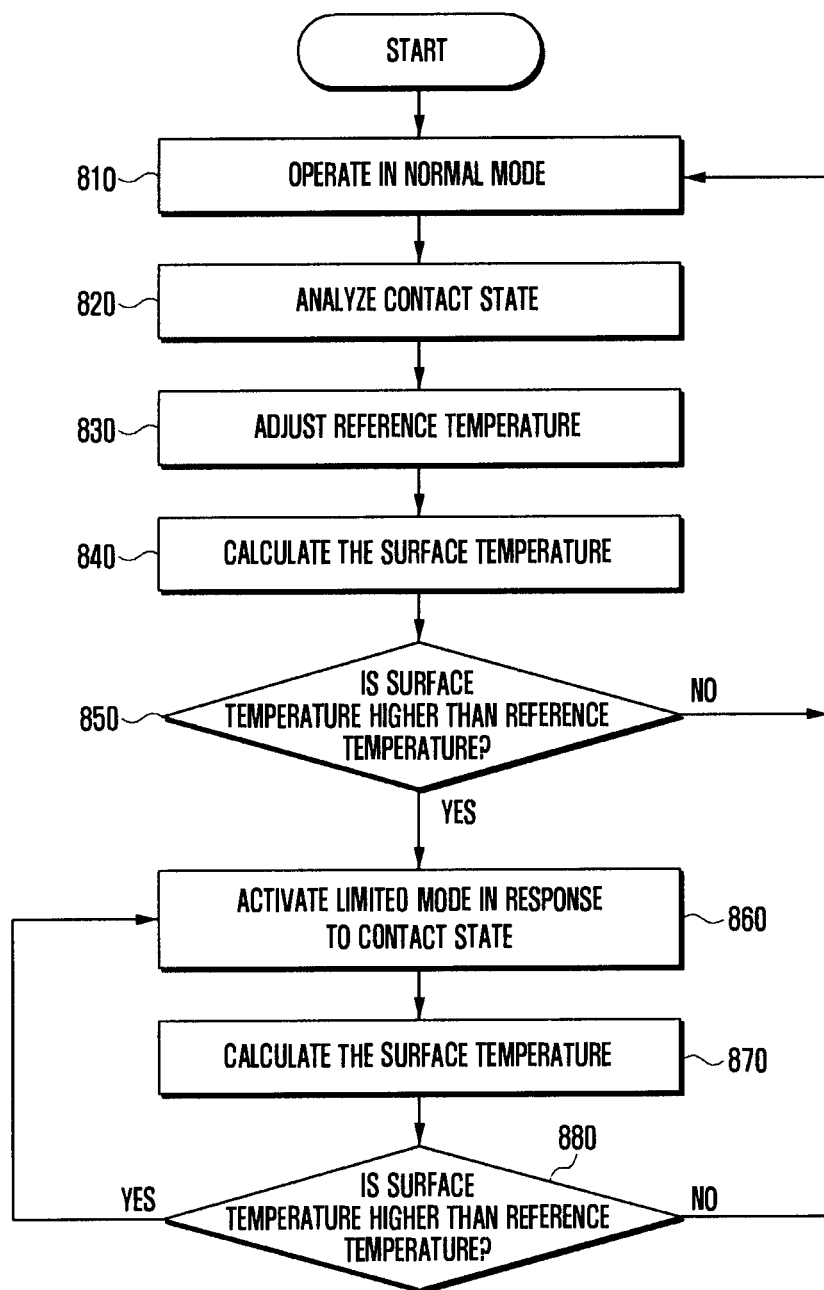
FIG. 8 is a flowchart of a method for setting a reference temperature and a limited mode based on a contact state of a user with an electronic device to control the operation of the electronic device according to various embodiments of the present disclosure.

FIG. 8 is a flowchart of a method for setting a reference temperature and a limited mode based on a contact state of a user with an electronic device and to control the operation of the electronic device according to various embodiments of the present disclosure.

The electronic device 200 may operate in a normal mode in step 810. The normal mode may indicate a state in which the electronic device 200 is not set to a limited mode.

The electronic device 200 may analyze a contact state of the user using the sensor module 240 in step 820. The contact state of the user may include a contact location and a contact time. The measured contact location and contact time of the user may be used to control the operation of the electronic device 200 by changing a reference temperature for executing the limited mode. Here, the term "contact" may include the meaning of approach. That is, the electronic device 200 may regard approach of a detection object to within a preset distance from some region, as well as direct contact of the detection object with the electronic device 200, as contact.

The electronic device 200 may determine, in step 820, whether the user comes into contact with the vicinity of a component (e.g. a surface of the electronic device 200 perpendicular to the component) of the electronic device 200 using the sensor module 240. At least one component performing each function in the electronic device 200 may be located in a specific region on a PCB in the electronic device and the electronic device 200 may load the location of each component from the memory 230. Accordingly, the electronic device 200 may determine whether the user comes into contact with the vicinity of the component of the electronic device 200 by comparing the location of the component with the contact location of the user.

The electronic device 200 may measure a contact time, during which the user comes into contact with the electronic device 200, using the sensor module 240 in step 820. For example, the electronic device 200 may measure the contact time, during which the user is in contact with the electronic device 200, using the grip sensor 240F formed outside the electronic device 200. In addition, the electronic device 200 may measure the contact time of the user using the touch panel 252 coupled with the display module 260.

The electronic module 200 may change, in step 820, a preset reference temperature based on the contact state of the user measured in step 820. The reference temperature may mean a temperature which is a reference for changing the operation mode (e.g. a normal mode or limited mode) of at least one component (e.g. a processor or a display module) constituting the electronic device 200. Specifically, the electronic device 200 may set a temperature at which the limited mode is to be executed using the contact state of the user.

In an embodiment, if the user comes into contact with a region distant from a component of the electronic device 200, the electronic device 200 may set the reference temperature to a high level. This is because there is a low probability of causing the user inconvenience such as a low-temperature burn in a situation in which the user does not come in contact with the vicinity of the component. If the reference temperature is increased, since at least one component may operate in the normal mode for a longer time than an operation time before the reference temperature is increased, the electronic device 200 may provide a more suitable environment to the user in performing a function.

In an embodiment, if the user comes into contact with a region adjacent to the component of the electronic device 200, the electronic device 200 may set the reference temperature to a low level. This is because there is a high probability of causing the user inconvenience such as a low-temperature burn in a situation in which the user comes into contact with the vicinity of the component. If the reference temperature is decreased, since at least one component constituting the electronic device 200 may rapidly switch to the limited mode and operate in the limited mode compared with the case where the reference temperature is not decreased, the electronic device 200 can be prevented from generating excessive heat and thus inconvenience such as a low-temperature burn can be prevented.

In an embodiment, if the contact time of the user reaches a preset threshold value, the electronic device 200 may reset the reference temperature. For example, when the reference temperature of the electronic device 200 is 50 degrees Celsius and the temperature of the surface of the electronic device 200 with which the user comes into contact is 48 degrees Celsius, if the contact time of the user reaches 10 minutes, the possibility of the user suffering from a low-temperature burn may increase. Therefore, the electronic device 200 may change the reference temperature to 45 degrees Celsius even though the surface temperature does not reach 50 degrees Celsius which is a current reference temperature. The electronic device 200 may activate the limited mode more rapidly and can protect the user from a low-temperature burn by adjusting the reference temperature in response to the contact time of the user. In step 840, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 840. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 850, the electronic device 200 may compare the surface temperature with the reference temperature adjusted in step 840.

If the surface temperature is lower than the reference temperature in step 850, the electronic device may return to step 810 to continue to operate in the normal mode.

If the surface temperature is higher than the reference temperature in step 850, the electronic device 200 may return to step 860 to operate in the limited mode.

The electronic device 200 may differently activate the limited mode for controlling the operation of the electronic device 200 in step 860 based on the contact state of the user measured in step 820. The limited mode may mean a state for limiting the operation of a component (e.g. a controller or a display) constituting the electronic device 200. For example, the clock of the AP 210 of the electronic device 200, the resolution of a display, and the frame rate of a camera may be lowered to values less than respective predetermined levels. That is, the electronic device 200 may control the surface temperature of the electronic device 200 through performance deterioration by activating limited mode.

The electronic device 200 may activate the limited mode in step 860 based on the contact location measured in step 820.

In an embodiment, the electronic device 200 may set a mode to a first limited mode when the user comes into contact with a region adjacent to the component of the electronic device 200. The first limited mode of the electronic device 200 may operate at lower performance than in a normal mode. For example, the electronic device 200 may change the clock of the processor 120 from 2.1 GHz to 0.7 GHz and change display brightness from 400 cd to 200 cd in the first limited mode. That is, the electronic device 200 may set the clock, display brightness, camera frame rate, camera resolution, or charge current according to the first limited mode to a lower value than in the normal mode.

In an embodiment, the electronic device 200 may set a mode to a second limited mode when the user comes into contact with a region distant from the component of the electronic device 200. In the second limited mode, the electronic device 200 may operate at lower performance than in the normal mode but operate at higher performance than in the first limited mode. For example, in the second limited mode, the electronic device 200 may change the clock of the processor 120 from 2.1 GHz to 1.4 GHz and change display brightness from 400 cd to 300 cd. That is, in the second limited mode, the electronic device 200 may set the clock, display brightness, camera frame rate, camera resolution, or charge current to a lower value than in the normal mode and to a higher value than in the first limited mode. This is because there is no need to abruptly lower the performance of the electronic device 200 in a situation in which the user of the electronic device 200 does not come in contact with the vicinity of the component of the electronic device 200. Therefore, in the second limited mode, since at least one component constituting the electronic device 200 may operate at higher performance than in the first limited mode, the electronic device 200 may provide a more suitable environment to the user in performing functions.

Although the electronic device 200 may set the limited mode to simultaneously control the performance of all components constituting the electronic device 200, the electronic device 200 may limit the performance of a component included in a region with which the user comes into contact based on the contact state of the user measured in step 820.

In an embodiment, when the user comes into contact with a region adjacent to a charge device, the electronic device 200 may set the limited mode in the charge device region. For example, the electronic device 200 may limit a charge current of 1 A of the charge device to 450 mA and maintain the performance of the other components.

In an embodiment, when the user comes into contact with a region adjacent to a camera module and a processor, the electronic device 200 may set the limited mode in the camera module region and the processor region. As an example, the electronic device 200 may limit a camera frame rate of 30 frames/sec to 15 frames/sec and limit a processor clock of 2.1 GHz to 1.4 GHz. Therefore, the charge current of the charge device may be maintained at 1 A without restrictions.

The electronic device 200 may activate the limited mode in step 860 based on the contact time of the user measured in step 820.

In an embodiment, if the contact time of the user reaches a preset threshold value, the electronic device 200 may activate the limited mode. For example, when the reference temperature of the electronic device 200 is 50 degrees Celsius and the temperature of the surface of the electronic device 200 with which the user comes into contact is 48 degrees Celsius, if the contact time of the user reaches 10 minutes, the possibility of the user suffering from a low-temperature burn may increase. Therefore, the electronic device 200 may immediately activate the limited mode even though the surface temperature does not reach 50 degrees Celsius which is a current reference temperature. Therefore, the electronic device 200 may activate the limited mode more rapidly and can protect the user from a low-temperature burn. In step 870, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 870. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 880, the electronic device 200 may compare the surface temperature with the reference temperature changed in step 870.

If the surface temperature is lower than the reference temperature in step 880, the electronic device may return to step 810 to continue to operate in the normal mode.

If the surface temperature is higher than the reference temperature in step 880, the electronic device 200 may return to step 860 to operate in the limited mode.

In various embodiments, if the surface temperature is higher than the reference temperature in step 680, the electronic device 200 may return to step 820 to analyze the contact state of the user. That is, even if the surface temperature of the electronic device 200 is higher than the reference temperature, since the contact state of the user may be changed, the electronic device 200 may analyze the contact state of the user again. Next, the electronic device 200 may continue to operate based on the above routine.

Meanwhile, an embodiment for the routine may be implemented based on at least one of the movement of the electronic device 200 and the approach state of an object, as well as on the contact state between the electronic device 200 and the object.

Figure 9:
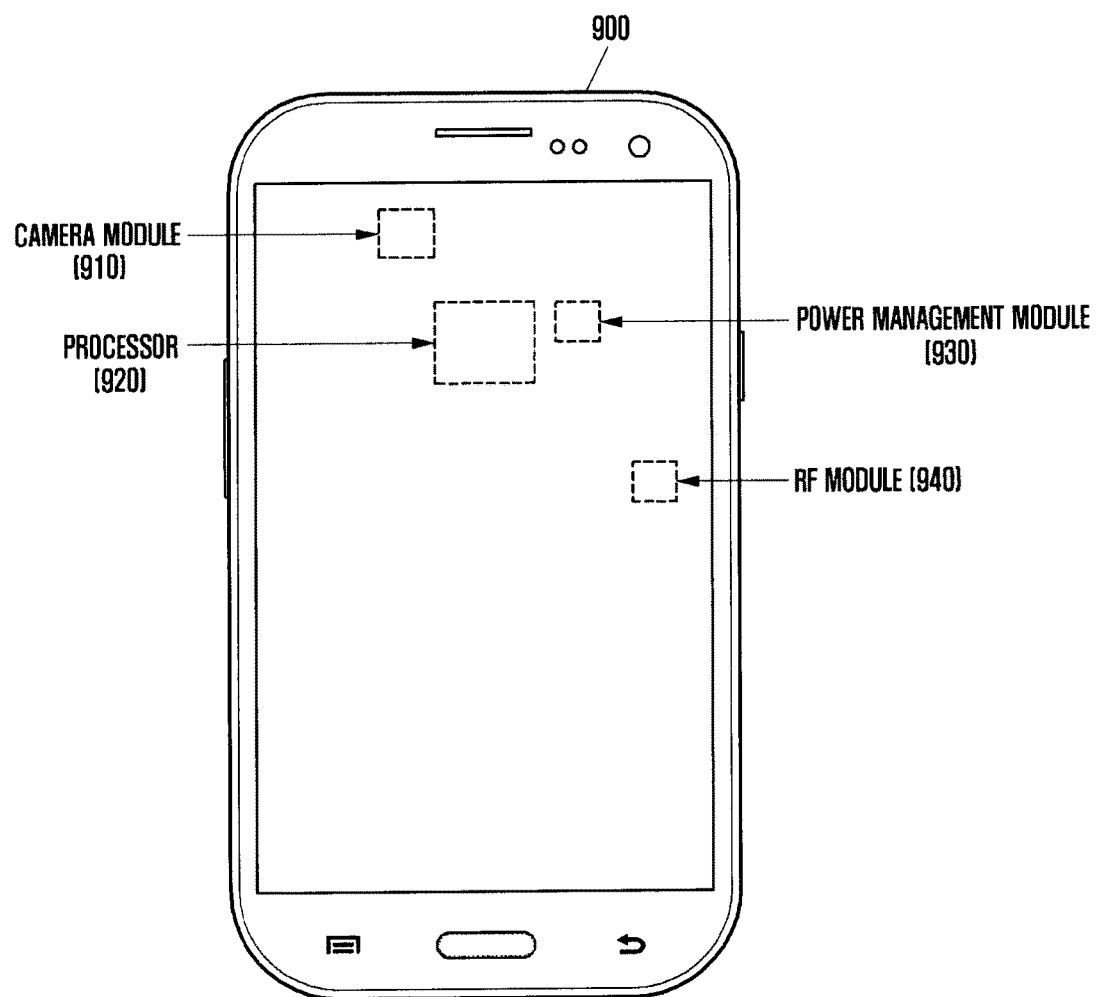
FIG. 9 is a diagram illustrating the arrangement of main components of an electronic device according to various embodiments of the present disclosure.

FIG. 9 is a diagram illustrating the arrangement of main components of an electronic device 900 according to various embodiments of the present disclosure.

Referring to FIG. 9, an electronic device 900 may include a camera module 910, a processor 920, a power management module 930, and a Radio Frequency (RF) module 940. The camera module 910, the processor 920, the power management module 930, and the RF module 940 may be main components in performing the functions of the electronic device 900. Accordingly, the electronic device 900 may measure the temperatures of the main components using the sensor module 240 and measure the temperature of the surface of the electronic device 900 adjacent to the main components based on the measured temperatures of the main components. The electronic device 900 may load the locations of the main components stored in the memory 230 and judges whether the user comes into contact with a region adjacent to the main components using the sensor module 240.

Figure 10:
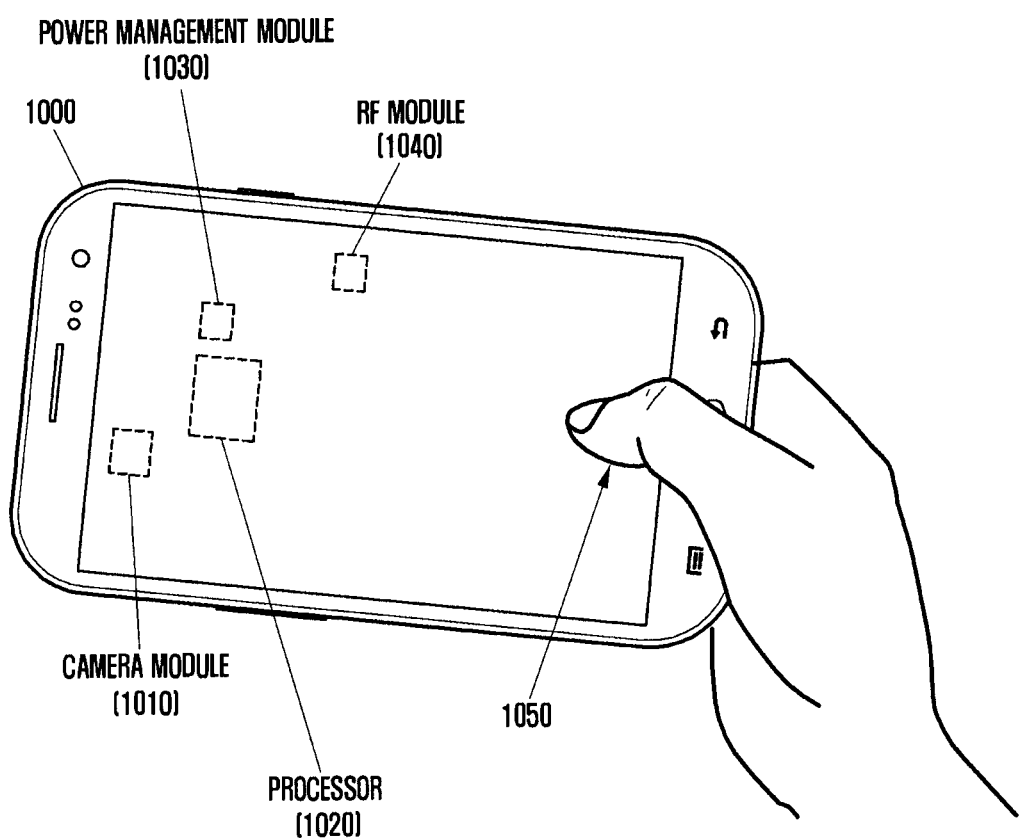
FIG. 10 is a diagram illustrating a contact state of a user with a region distant from main components of the electronic device.

FIG. 10 is a diagram illustrating a contact state of a user with a region distant from main components of the electronic device.

Referring to FIG. 10, the user comes into contact with a region 1050 distant from a camera module 1010, a processor 1020, a power management module 1030, and an RF module 1040, which are the main components of an electronic device 1000.

In an embodiment, if the user comes into contact with the region 1050 distant from the components of the electronic device 1000, the electronic device 1000 may set the reference temperature to a high level. This is because there is a low probability of causing the user inconvenience such as a low-temperature burn in a situation in which the user does not come in contact with the vicinity of the components. If the reference temperature is increased, since at least one component may operate in the normal mode for a longer time than an operation time before the reference temperature is increased, the electronic device 200 may provide a more suitable environment to the user in performing a function. In an embodiment, if the user comes into contact with the region 1050 distant from the main components of the electronic device 1000 (e.g. the case of activating a second limited mode), the electronic device 1000 may set a mode to another type of limited mode that is different from the limited mode when the user comes into contact with the main components (e.g. the case of activating a first limited mode). In the second limited mode, the electronic device 1000 may operate at lower performance than in the normal mode but operate at higher performance than in the first limited mode. This is because there is no need to abruptly lower the performance of the electronic device 1000 in a situation in which the user of the electronic device 1000 does not come in contact with the vicinity of the components of the electronic device 1000.

Figure 11:
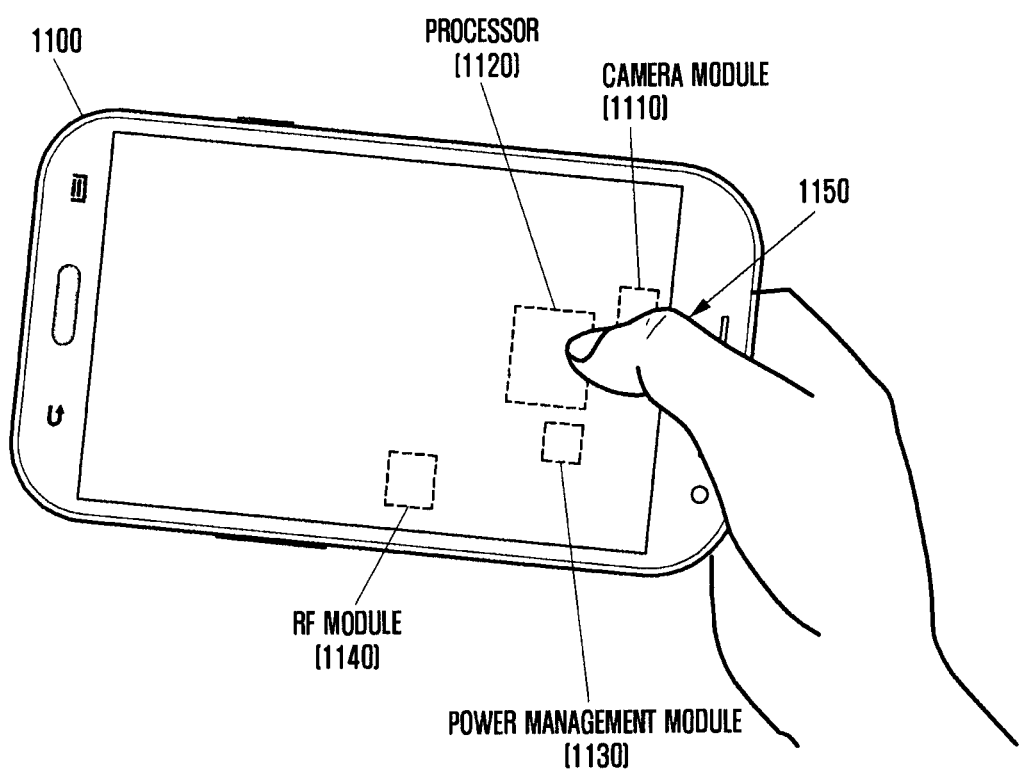
FIG. 11 is a diagram illustrating a contact state of a user with a region adjacent to main components of the electronic device.

FIG. 11 is a diagram illustrating a contact state of a user with a region adjacent to main components of the electronic device.

Referring to FIG. 11, the user of an electronic device 1100 comes into contact with a region 1150 adjacent to a camera module 1110 and a processor 1120, which are main components of an electronic device 1100.

In an embodiment, if the user comes into contact with a region 1150 adjacent to the camera module 1110 and the processor 1120, which are components of the electronic device 1100, the electronic device 1100 may set the reference temperature to a low level. This is because there is a high probability of causing the user inconvenience, such as a low-temperature burn, in a situation in which the user comes into contact with the region 1150 adjacent to the camera module 1110 and the processor 1120. If the reference temperature is decreased, since at least one component constituting the electronic device 1100 may rapidly switch to the limited mode and operate in the limited mode compared with the case where the reference temperature is not decreased, excessive heat of the electronic device 1100 is prevented and thus inconvenience such as a low-temperature burn can be prevented.

In an embodiment, if the user comes into contact with the region 1150 adjacent to the camera module 1110 and the processor 1120, which are the main components of the electronic device 1100, (e.g. the case of activating a first limited mode), the electronic device 1100 may set a mode to a limited mode that is different from the limited mode when the user comes into contact with a region distant from the main components (e.g. the case of activating a second limited mode). In the first limited mode, the electronic device 1100 may operate at lower performance than in the normal mode and the second limited mode. This is because a temperature should be rapidly controlled by lowering the performance of the electronic device 1100 below the level of performance in the second limited mode.

Although the electronic device 1100 may set the limited mode to simultaneously control the performance of all components constituting the electronic device 1100, the electronic device 1100 may limit the performance of the camera module 1110 and the processor 1120 included in a region with which the user comes into contact. Accordingly, the electronic device 1100 may control the other components, for example, a power management module 1130 and an RF module 1140, to operate in the normal mode without applying the limited mode.

Figure 12:
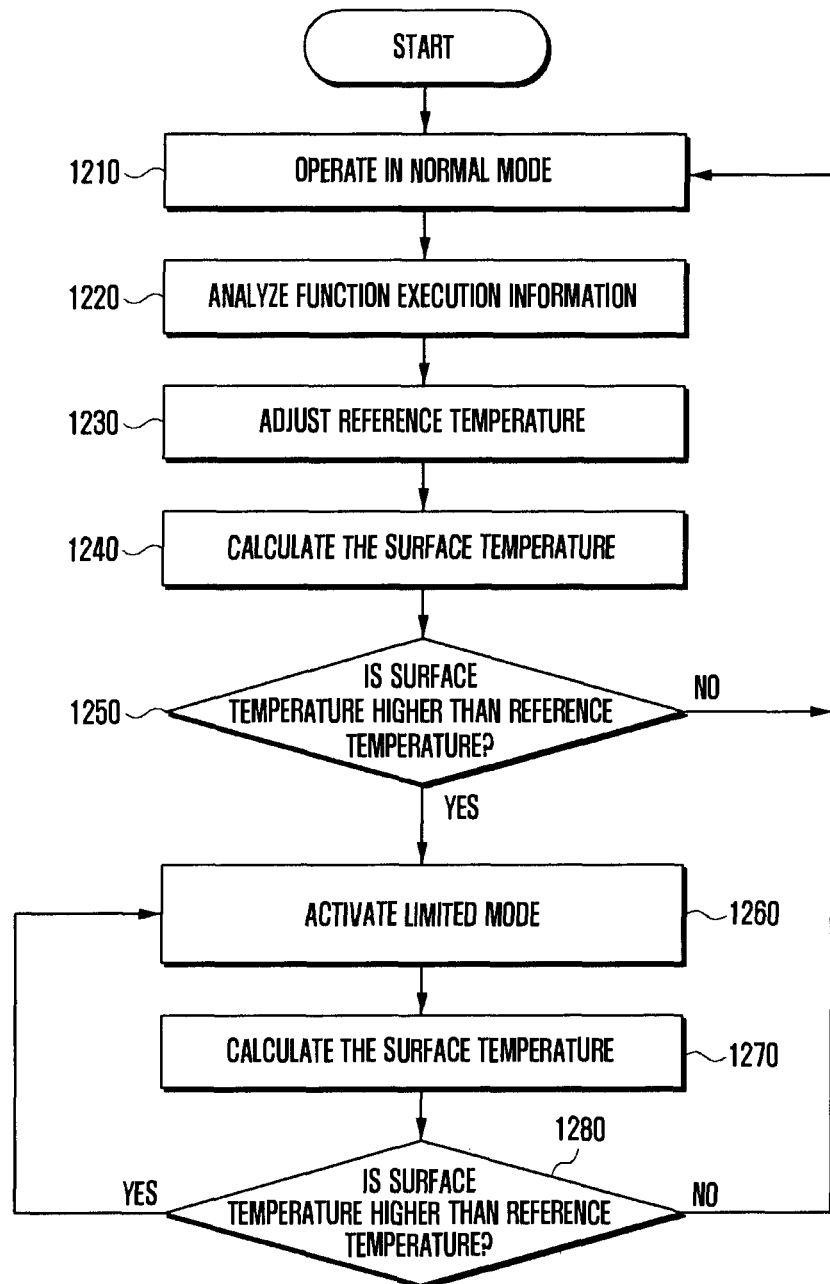
FIG. 12 is a flowchart of a method for controlling the operation of an electronic device by setting a reference temperature based on function execution information of the electronic device according to various embodiments of the present disclosure.

FIG. 12 is a flowchart of a routine for controlling the operation of an electronic device by setting a reference temperature based on function execution information of the electronic device according to various embodiments of the present disclosure.

The electronic device 200 may operate in a normal mode in step 1210. The normal mode may indicate a state in which the electronic device 200 is not set to a limited mode.

The electronic device 200 may analyze function execution information about functions which are being executed in the electronic device 200 in step 1220. The function execution information may include the types of functions (e.g. phone call, download, etc.) which are being executed in the electronic device 200 and execution states of the functions (e.g. a landscape/portrait mode, the amount of data downloaded, etc.). The analyzed function types and function execution states may be used to control the operation of the electronic device 200 by adjusting a reference temperature at which a limited mode is performed.

The electronic device 200 may adjust, in step 1230, a preset reference temperature based on the function execution information analyzed in step 1220. The reference temperature may mean a temperature which is a reference for changing the operation mode (e.g. a normal mode or limited mode) of at least one component (e.g. a processor or a display module) forming a portion of the electronic device 200. Specifically, the electronic device 200 may set a temperature at which the limited mode is to be executed using the function execution information.

In an embodiment, the user of the electronic device 200 may perform a phone call application. If the user performs a phone call function, the face of the user may come in contact with the electronic device 200. Therefore, the electronic device 200 may set the reference temperature to a low value using information about the phone call function even if the user does not come in contact with at least one component. Since the user is expected to come in contact with the surface of the electronic device 200 adjacent to a component, the electronic device 200 is prevented from overheating by lowering the reference temperature, thereby preventing inconvenience of the user caused by heat generation.

In step 1240, the processor 120/210 may calculate the surface temperature of the electronic device 200. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 1240. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 1250, the electronic device 200 may compare the surface temperature with the reference temperature changed in step 1230.

If the surface temperature is lower than the reference temperature in step 1250, the electronic device 200 may return to step 1210 to continue to operate in the normal mode.

If the surface temperature is higher than the reference temperature in step 1250, the electronic device 200 may return to step 1260 to operate in the limited mode.

The electronic device 200 may activate the limited mode for controlling the operation of the electronic device 200 in step 1260. The limited mode may mean a state for limiting the operation of a component (e.g. a controller or a display) constituting the electronic device 200.

For example, the clock of the AP 210 of the electronic device 200, the resolution of a display, and the frame rate of a camera may be lowered to values less than respective predetermined levels. The electronic device 200 may control the surface temperature of the electronic device 200 through performance deterioration by operating in the limited mode.

In step 1270, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 1240. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 1280, the electronic device 200 may compare the surface temperature with the reference temperature changed in step 1230.

If the surface temperature is lower than the reference temperature in step 1280, the electronic device may return to step 1210 to continue to operate in the normal mode.

If the surface temperature is higher than the reference temperature in step 1280, the electronic device 200 may return to step 1260 to operate in the limited mode.

In various embodiments, if the surface temperature is higher than the reference temperature in step 1280, the electronic device 200 may return to step 1220 to analyze the function execution information. That is, even if the surface temperature of the electronic device 200 is higher than the reference temperature, since the function execution information may be changed, the electronic device 200 may analyze the function execution information again. Next, the electronic device 200 may continue to perform an operation based on the above routine.

Figure 13:
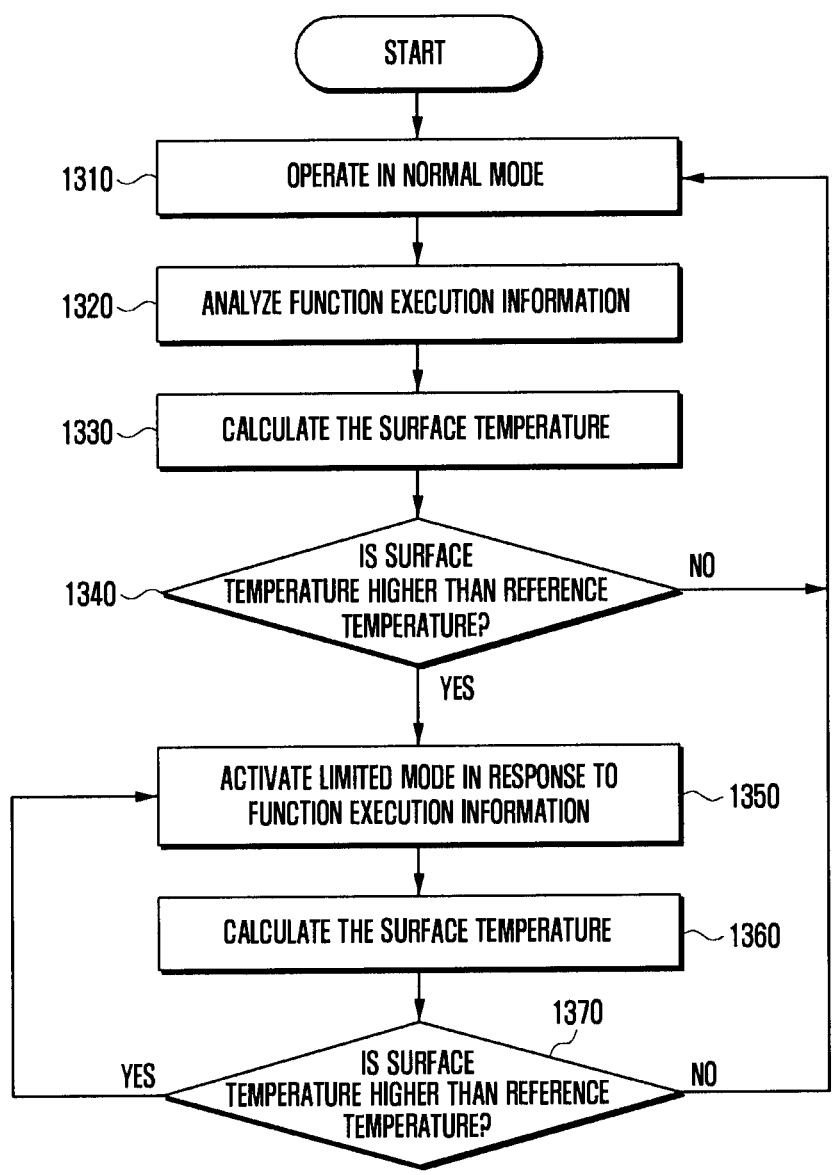
FIG. 13 is a flowchart of a method for controlling the operation of an electronic device by setting a limited mode based on function execution information of the electronic device according to various embodiments of the present disclosure.

FIG. 13 is a flowchart of a routine for controlling the operation of an electronic device by setting a limited mode based on a function execution state of the electronic device according to various embodiments of the present disclosure.

The electronic device 200 may operate in a normal mode in step 1310. The normal mode may indicate a state in which the electronic device 200 is not set to a limited mode.

The electronic device 200 may analyze function execution information about functions which are being executed in the electronic device 200 in step 1320. The function execution information may include the types of functions (e.g. phone call, download, etc.) which are being executed in the electronic device 200 and execution states of functions (e.g. a landscape/portrait mode, the amount of data downloaded, etc.). The analyzed function types and function execution states may be used to control the operation of the electronic device 200 by determining types of limited modes at a reference temperature.

In step 1330, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 1330. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

The electronic device 200 may compare the surface temperature with a preset reference temperature in step 1340. The reference temperature may be preset by a manufacturer.

If the surface temperature is lower than the reference temperature in step 1340, the electronic device may return to step 1310 to continue to operate in the normal mode.

If the surface temperature is higher than the reference temperature in step 1340, the electronic device 200 may return to step 1350 to operate in the limited mode based on the function execution information.

The electronic device 200 may differently activate the limited mode for controlling the operation of the electronic device 200 in step 1350 based on the function execution information analyzed in step 1320. The limited mode may mean a state for limiting the operation of a component (e.g. a controller or a display) constituting the electronic device 200. For example, the clock of the AP 210 of the electronic device 200, the resolution of the display 260, and the frame rate of the camera 291 may be lowered to values less than respective predetermined levels. That is, the electronic device 200 may control the surface temperature of the electronic device 200 through performance deterioration by activating limited mode.

In an embodiment, the electronic device 200 may change a limited mode in response to a state in which the user is executing a download function. If the remaining amount of data to be downloaded is less than a threshold value (e.g. 90%), the electronic device 200 may lower the performance of a processor from 2.1 GHz to 1.4 GHz by executing a first limited mode. Meanwhile, if the remaining amount of data to be downloaded is greater than the threshold value (e.g. 90%), the electronic device 200 may lower the performance of the processor from 1.4 GHz to 0.7 GHz by executing a second limited mode. Thus, inconvenience caused by excessive heat can be prevented even if the user immediately uses the electronic device 200 at a time when download is completed.

In step 1360, the processor 120/210 may calculate the surface temperature of the electronic device. The electronic device 200 may measure the surface temperature of the electronic device 200 based on the measured temperatures of the components in step 1360. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

The electronic device 200 may compare the surface temperature with a preset reference temperature in step 1370. The reference temperature may be preset by a manufacturer.

If the surface temperature is lower than the reference temperature in step 1370, the electronic device may return to step 1310 to continue to operate in the normal mode.

If the surface temperature is higher than the reference temperature in step 1370, the electronic device 200 may return to step 1350 to operate in the limited mode.

In various embodiments, if the surface temperature is higher than the reference temperature in step 1370, the electronic device 200 may return to step 1320 to analyze the function execution information. That is, even if the surface temperature of the electronic device 200 is higher than the reference temperature, since the function execution information may be changed, the electronic device 200 may analyze the function execution information again. Next, the electronic device 200 may continue to perform an operation based on the above routine.

Figure 14:
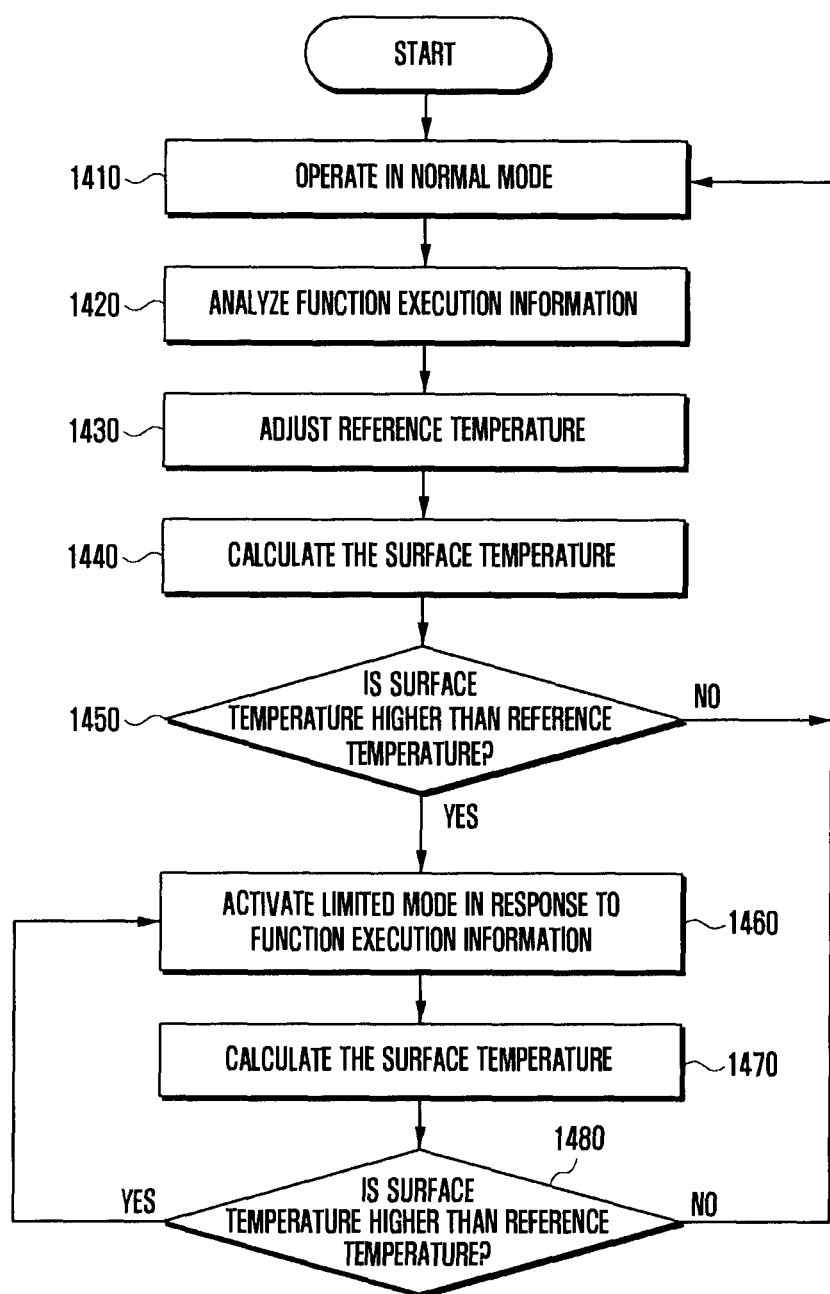
FIG. 14 is a flowchart of a method for controlling the operation of an electronic device by setting a reference temperature and a limited mode based on function execution information of the electronic device according to various embodiments of the present disclosure.

FIG. 14 is a flowchart of a routine for controlling the operation of an electronic device by setting a reference temperature and a limited mode based on a function execution state of the electronic device according to various embodiments of the present disclosure.

The electronic device 200 may operate in a normal mode in step 1410. The normal mode may indicate a state in which the electronic device 200 is not set to a limited mode.

The electronic device 200 may analyze function execution information about functions which are being executed in the electronic device in step 1420. The function execution information may include the types of functions (e.g. phone call, download, etc.) which are being executed in the electronic device 200 and execution states of the functions (e.g. a landscape/portrait mode, the amount of data downloaded, etc.). The analyzed function types and function execution states may be used to control the operation of the electronic device 200 by adjusting a reference temperature at which a limited mode is performed.

The electronic device 200 may adjust, in step 1430, a preset reference temperature based on the function execution information analyzed in step 1420. The reference temperature may mean a temperature which is a reference for changing the operation mode (e.g. a normal mode or limited mode) of at least one component (e.g. a processor or a display module) constituting the electronic device 200. Specifically, the electronic device 200 may set a temperature at which the limited mode is to be executed using the function execution information.

In an embodiment, the user of the electronic device 200 may perform a phone call application. If the user performs a phone call function, the face of the user may come in contact with the electronic device 200. Therefore, the electronic device 200 may set the reference temperature to a low value using information about a phone call function even if the user does not come in contact with at least one component. Since the user is expected to come in contact with the surface of the electronic device 200 adjacent to the component, the electronic device 200 is prevented from overheating by lowering the reference temperature, thereby preventing inconvenience of the user caused by heat generation.

In step 1440, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component. Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and use the average value as the temperature of the electronic device 200.

The electronic device 200 may measure the surface temperature of the electronic device 200 based on the measured temperatures of the components in step 1440. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 1450, the electronic device 200 may compare the surface temperature with the reference temperature changed in step 1440.

If the surface temperature is lower than the reference temperature in step 1450, the electronic device 200 may return to step 1410 to continue to operate in the normal mode.

If the surface temperature is higher than the reference temperature in step 1450, the electronic device 200 may return to step 1460 to operate in the limited mode based on the function execution information.

The electronic device 200 may differently activate the limited mode in step 1460 by expecting the contact and/or approach of the user based on the function execution information analyzed in step 1420. The limited mode may mean a state for limiting the operation of a component (e.g. a controller or a display) constituting the electronic device 200. For example, the clock of the AP 210 of the electronic device 200, the resolution of the display module 260, and the frame rate of the camera 291 may be lowered to values less than respective predetermined levels. That is, the electronic device 200 may control the surface temperature of the electronic device 200 through performance deterioration by activating limited mode.

In an embodiment, the electronic device 200 may vary the limited mode in response to a state in which the user is executing a download function. If the remaining amount of data to be downloaded is less than a threshold value (e.g. 90%), the electronic device 200 may lower the performance of a processor from 2.1 GHz to 1.4 GHz by activating a first limited mode. Meanwhile, if the remaining amount of data to be downloaded is greater than the threshold value (e.g. 90%), the electronic device 200 may lower the performance of the processor from 1.4 GHz to 0.7 GHz by activating a second limited mode. Thus, inconvenience caused by excessive heat can be prevented even if the user immediately uses the electronic device 200 at a time when the download is completed.

In an embodiment, the electronic device 200 may vary the limited mode in response to video playback. During video playback, there may be information about a playback time of played video. The electronic device 200 may expect that the user will not perform a contact operation while an additional video playback time is needed. Therefore, the electronic device 200 may activate a normal mode during the remaining playback time. In addition, the electronic device 200 may set the reference temperature at which the electronic device 200 enters the limited mode to a high level while an additional video playback time is needed or set the reference temperature such that the electronic device 200 operates in the limited mode at higher performance even if the electronic device 200 enters the limited mode.

In step 1470, the processor 120/210 may calculate the surface temperature of the electronic device. The electronic device 200 may measure the temperatures of components using the temperature sensor 240J and calculate the temperature of a portion of the electronic device 200 (e.g. the surface or predetermined internal region of the electronic device 200) using the measured temperatures. In this case, the predetermined internal region may include a component. In more detail, the temperature of a component in which the temperature sensor 240J is not installed may be calculated based on a temperature measured in another component.

Meanwhile, the temperature sensor 240J may be installed in an electric component such as a PCB, a battery, or an FPCB in the electronic device 200. The temperature sensor 240J may be located on the surface of at least one component or in the housing of at least one component. The temperature measurement module 325 may calculate the average value of the temperatures of components by measuring the temperatures of the components and the average value as the temperature of the electronic device 200.

The electronic device 200 may measure the surface temperature of the electronic device 200 based on the measured temperatures of the components in step 1470. The electronic device 200 may measure the surface temperature of the electronic device 200 by referring to a table showing the correlation between the temperature of a component and the surface temperature of the electronic device 200. This is because the temperature of the component measured using the temperature sensor 240J may be different from the surface temperature of the electronic device 200.

In step 1480, the electronic device 200 may compare the surface temperature with the reference temperature changed in step 1470.

If the surface temperature is lower than the reference temperature in step 1480, the electronic device 200 may return to step 1410 to continue to operate in the normal mode.

If the surface temperature is higher than the reference temperature in step 1480, the electronic device 200 may return to step 1460 to operate in the limited mode based on the function execution information.

In various embodiments, if the surface temperature is higher than the reference temperature in step 1480, the electronic device 200 may return to step 1420 to analyze the function execution information. That is, even if the surface temperature of the electronic device 200 is higher than the reference temperature, since the function execution information may be changed, the electronic device 200 may analyze the function execution information again. Next, the electronic device 200 may continue to perform an operation based on the above routine.

Figure 15:
FIG. 15 is a diagram illustrating a method for controlling the operation of an electronic device in response to call function execution of the electronic device according to various embodiments of the present disclosure.

FIG. 15 is a diagram illustrating a method for controlling the operation of an electronic device in response to call function execution of the electronic device according to various embodiments of the present disclosure.

Referring to FIG. 15, the user of the electronic device 200 may perform a phone call application. If the user performs a phone call function, the face of the user may come in contact with the electronic device 200. If the electronic device 200 comes into contact with the face of the user while the electronic device 200 is in an overheated state, the user may suffer from inconvenience such as perspiration or burning. Therefore, the electronic device 200 may set the reference temperature to a low value by sensing the phone call function even if the user does not come in contact with at least one component. Since the user is expected to come in contact with the surface of the electronic device 200 adjacent to the component, the electronic device 200 is prevented from overheating by lowering the reference temperature, thereby preventing inconvenience to the user caused by heat generation. In addition, if the electronic device 200 senses that the user performs the phone call function, the electronic device 200 may activate a limited mode corresponding to the phone call function. Since the phone call function does not utilize a high-performance specification, the electronic device may control at least one component of the electronic device 200 to operate at low performance. Therefore, inconvenience of the user during a long call time can be prevented by controlling heat generation by the electronic device 200.

Figure 16:
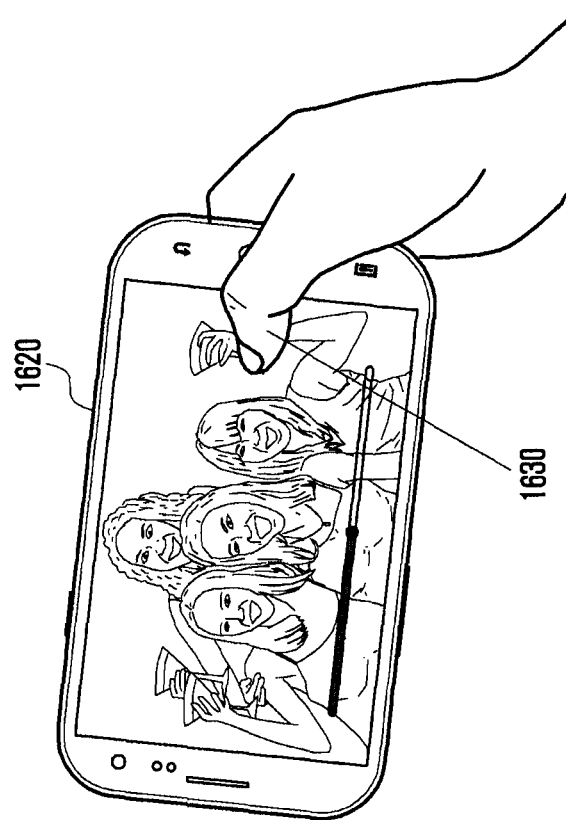
FIG. 16 is a diagram illustrating a method for controlling the operation of an electronic device in response to execution of a landscape mode or a portrait mode, among various kinds of function execution information of the electronic device according to various embodiments of the present disclosure.
Figure 16:
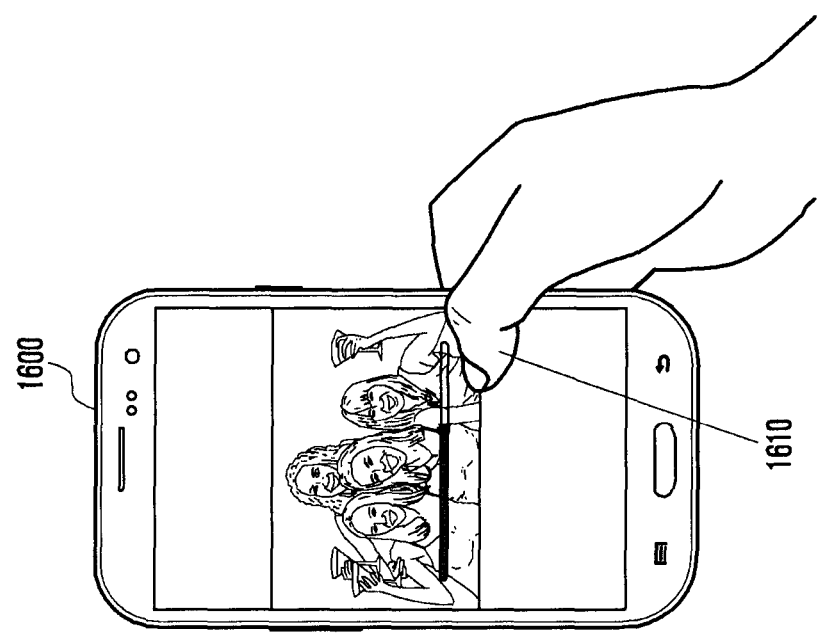

FIG. 16 is a diagram illustrating a method for controlling the operation of an electronic device in response to execution of a landscape mode or a portrait mode, among various kinds of function execution information of the electronic device according to various embodiments of the present disclosure.

Referring to FIG. 16, the electronic device 200 may play back a video using a portrait mode 1600 or a landscape mode 1620. Referring to the arrangement of the main components of FIG. 9, in the portrait mode, the contact region 1601 of the user may be located at a region distant from the main components. Meanwhile, in the landscape mode, the contact region 1630 of the user may be located at a region adjacent to the main components. Therefore, the electronic device 200 may raise the reference temperature or execute a limited mode having higher performance (e.g. a clock of 1.4 GHz) in the portrait mode 1600. The electronic device 200 may lower the reference temperature or execute a limited mode having low performance (e.g. a clock of 0.7 GHz) in the landscape mode 1620.

A method for controlling the operation of an electronic device according to various embodiments of the present disclosure may include an operation of sensing a temperature of at least one component constituting the electronic device and generating a first signal based on the sensed temperature; an operation of sensing at least one of movement of the electronic device, an approach state of an object to the electronic device, and a contact state of the object with the electronic device and generating a second signal based on at least one of the movement of the electronic device, the approach state of the object, and the contact state of the object; and an operation of controlling an operation of the component based on at least one of the first signal and the second signal.

The operation of sensing the approach state and the contact state of the object may include sensing at least one of an approach location, a contact location, and a contact time of the object.

The method may further include an operation of calculating at least one of a temperature of a portion of the electronic device and a surface temperature of the electronic device based on the first signal.

The operation of controlling the operation of the component may include an operation of setting a reference temperature at which a limited mode is to be activated and an operation of performing the limited mode when at least one of a temperature corresponding to the first signal and a temperature calculated from the first signal is equal to or higher than the reference temperature.

The method may further include an operation of lowering the reference signal when at least one of a contact location and an approach location of the object is closer than a predetermined distance from a surface of the electronic device adjacent to the component and an operation of raising the reference signal when at least one of the contact location and the approach location of the object is the same distance or farther than the predetermined distance from the surface of the electronic device adjacent to the component.

The method may further include an operation of lowering the reference temperature when a contact time of the object reaches a contact limit time according to the temperature.

The method may further include an operation of controlling the operation of the at least one component located at a region closer than a predetermined distance from at least one of a contact location and an approach location of the object in the limited mode.

The method may further include an operation of analyzing function execution information of the electronic device and an operation of predicting at least one of the approach state and the contact state of the object based on the function execution information to control the operation of the component, and the function execution information may include at least one of a type of a function which is being executed in the electronic device and an execution state of the function.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least some of the programming modules may be implemented (for example, executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium including machine executable code, in accordance with statutory subject matter under 35 U.S.C. § 101 and does not constitute software per se.

According to various embodiments, a computer-readable recording medium may record, in an electronic device, a program for executing an operation of sensing a temperature of at least one component constituting the electronic device and generating a first signal based on the sensed temperature, an operation of sensing at least one of movement of the electronic device, an approach state of an object to the electronic device, and a contact state of the object with the electronic device and generating a second signal based on the movement of the electronic device, the approach state of the object, and the contact state of the object, and an operation of controlling an operation of the component based on at least one of the first signal and the second signal.

The method for controlling the operation of an electronic device and the electronic device using the same according to various embodiments of the present disclosure can control the operation of the electronic device based on at least one of a contact state of a user and function execution information.

The embodiments disclosed in the specification and drawings are merely presented to easily describe technical contents of various embodiments of the present disclosure and help the understanding of them and are not intended to limit the various embodiments of the present disclosure. Therefore, all changes or modifications derived from the technical idea of various embodiments of the present disclosure as well as various embodiments disclosed herein should be construed to fall within the various embodiments of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising:
   a touchscreen display;
   a plurality of components internal to the electronic device disposed under the touchscreen display;

a memory storing information corresponding to locations of the each of the plurality of components disposed under the touchscreen display;

a first sensor configured to detect a temperature of the a plurality of components and generate a first signal based on the detected temperature; and at least one processor, configured to:

calculate a surface temperature of the electronic device based on the detected temperature, in response to detecting a touch input to the touchscreen display, load from the memory the stored information corresponding to a location of at least one component of the plurality of components, compare a location where the touch input contacts the touchscreen display to the loaded information corresponding to the location of the at least one component to determine whether the location of the touch input corresponds to the location of the at least one component, alter a reference temperature based on whether the location of the touch input is determined to correspond to the location of the at least one component, and modify operation of the at least one component if the surface temperature of the electronic device is higher than the altered reference temperature, wherein the at least one processor is configured to operate the at least one component in a limited mode and to operate other components among the plurality of components in a normal mode.

2. The electronic device of claim 1, wherein the at least one component includes the at least one processor, wherein a reference temperature is altered when the location of the touch input is within a preset distance, and wherein heat generated by the at least one component is reduced when the surface temperature is higher than the altered reference temperature, and wherein when the location of the touch input does not correspond to the location of the at least one component while contacting the touchscreen display, altering the reference temperature of the at least one component includes raising the reference temperature.

3. The electronic device of claim 1, further comprising a second sensor including at least one of an acceleration sensor, a gyro sensor, a geomagnetic sensor, a gesture sensor, a grip sensor, a proximity sensor, a biometric sensor, a temperature sensor, an illuminance sensor, an ultraviolet (UV) sensor, and a Hall sensor, wherein the at least one processor is further configured to:

detect execution of an active call function with an external device, and modify operation of at least a particular component from among the plurality of components to lower the surface temperature of the electronic device during the call function.

4. The electronic device of claim 1, wherein the touchscreen display further senses at least one of an approach location, and a contact time of the touch input upon sensing at least one of an approach state and a contact state of the touch input.

5. The electronic device of claim 1, wherein the at least one processor calculates at least one of a temperature of a portion of the electronic device, wherein the portion of the electronic device is located in the at least one component where the touch input contacts the touchscreen display.

6. The electronic device of claim 2, wherein the modifying the operation includes the limited mode activated when the surface temperature is equal to or higher than the reference temperature upon controlling the operation of the component.

7. The electronic device of claim 6, wherein the at least one processor is further configured to:

lower the reference temperature when at least one of a contact location and an approach location of the touch input is closer than a predetermined distance from the surface of the electronic device adjacent to the at least one component, and raise the reference temperature when at least one of the contact location and the approach location of the touch input is the same distance or farther than the predetermined distance from the surface of the electronic device adjacent to the at least one component.

8. The electronic device of claim 6, further comprising:

a temperature sensor, the at least one processor further configured to: after altering the reference temperature, detect the surface temperature of the electronic device, wherein the at least one processor is further configured to lower the reference temperature when a contact time of the touch input reaches a contact limit time according to the reference temperature.

9. The electronic device of claim 6, wherein the at least one processor controls the operation of the at least one component located at a region closer than a predetermined distance from at least one of a contact location and an approach location of the touch input in the limited mode.

10. The electronic device of claim 1, wherein the at least one processor controls the operation of the at least one component by analyzing function execution information of the electronic device and predicting at least one of an approach state and a contact state of the touch input based on the function execution information and wherein the function execution information includes at least one of a type of a function which is being executed in the electronic device and an execution state of the function.

11. A method for controlling an operation of an electronic device, the method comprising:

detecting by a first sensor a temperature of a plurality of components internal to the electronic device and generating a first signal based on the detected temperature, the electronic device including the plurality of components disposed underneath a touchscreen display of the electronic device;

calculating a surface temperature of the electronic device based on the detected temperature;

in response to detecting a touch input to the touchscreen display, loading from a memory information indicating a location of at least one component of the plurality of components disposed underneath the touchscreen display;

comparing a location where the touch input contacts the touchscreen display to the loaded information corresponding to the location of the at least one component to determine whether the location of the touch input corresponds to the location of the at least one component of the plurality of components;

altering, by a processor, a reference temperature based on whether the location of the touch input is determined to correspond to the location of the at least one component; and modifying operation of the at least one component if the surface temperature is higher than the altered reference temperature, wherein modifying the operation of the at least one component comprises:
operating the at least one component in a limited mode; and
operating other components among the plurality of components in a normal mode.

12. The method of claim 11, wherein sensing an approach state and a contact state of the touch input comprises sensing at least one of an approach location, a contact location, and a contact time of the touch input,
wherein a reference temperature is altered when the location of the touch input is within a preset distance,
wherein heat generated by the at least one component is reduced when the surface temperature is higher than the altered reference temperature, and
wherein when the location of the touch input does not correspond to the location of the at least one component while contacting the touchscreen display, altering the reference temperature of the at least one component includes raising the reference temperature.

13. The method of claim 11, wherein calculating the surface temperature of the electronic device comprises: calculating at least one of a temperature of a portion of the electronic device,
wherein the portion of the electronic device is located in the at least one component where the touch input contacts the touchscreen display.

14. The method of claim 12, wherein modifying the operation of the at least one component comprises:
activating the limited mode when a detected temperature is equal to or higher than the reference temperature.

15. The method of claim 14, further comprising:
lowering the reference temperature when at least one of a contact location and an approach location of the touch input is closer than a predetermined distance from the surface of the electronic device adjacent to the component; and
raising the reference temperature when at least one of the contact location and the approach location of the touch input is the same distance or farther than the predetermined distance from the surface of the electronic device adjacent to the component.

16. The method of claim 14, further comprising:
after altering the reference temperature, detecting the surface temperature of the electronic device using a temperature sensor; and
lowering the reference temperature when a contact time of the touch input reaches a contact limit time according to the reference temperature.

17. The method of claim 14, further comprising controlling the operation of the at least one component located at a region closer than a predetermined distance from at least one of a contact location and an approach location of the touch input in the limited mode.

18. The method of claim 11, further comprising:
analyzing function execution information of the electronic device; and
predicting at least one of an approach state and a contact state of the touch input based on the function execution information to control the operation of the component,
wherein the function execution information includes at least one of a type of a function which is being executed in the electronic device and an execution state of the function.

19. A non-transitory computer-readable recording medium storing programming instructions executable by at least one processor to cause an electronic device to:
detect a temperature of a plurality of components internal to the electronic device and generate a first signal based on the detected temperature, the electronic device including the plurality of components disposed underneath a touchscreen display of the electronic device;
calculate a surface temperature of the electronic device based on the detected temperature;
in response to detecting a touch input to the touchscreen display, load from a memory information indicating a location of at least one component of the plurality of components disposed underneath the touchscreen display;
compare a location where the touch input contacts the touchscreen display to the loaded information corresponding to the location of the at least one component to determine whether the touch input corresponds to the location of the at least one component of the plurality of components;
alter, by the at least one processor, a reference temperature based on whether the location of the touch input is determined to correspond to the location of the at least one component; and
modify operation of the at least one component if the surface temperature is higher than the altered reference temperature,
wherein the at least one processor is configured to operate the at least one component in a limited mode and to operate other components among the plurality of components in a normal mode.

20. The electronic device of claim 1, wherein the at least one processor is configured to calculate the surface temperature of the electronic device by referring to a table indicating a correlation between a temperature of a component and the surface temperature of the electronic device.

* * * * *